United States Patent
Ma

(10) Patent No.: US 6,673,285 B2
(45) Date of Patent: Jan. 6, 2004

(54) REVERSE FABRICATION OF POROUS MATERIALS

(75) Inventor: Peter X. Ma, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 172 days.

(21) Appl. No.: 09/853,478

(22) Filed: May 11, 2001

(65) Prior Publication Data

US 2002/0005600 A1 Jan. 17, 2002

Related U.S. Application Data

(60) Provisional application No. 60/203,973, filed on May 12, 2000.

(51) Int. Cl.[7] .............................................. B29C 67/20
(52) U.S. Cl. ........................ 264/49; 29/527.1; 264/219; 264/317
(58) Field of Search .......................... 264/49, 219, 317; 521/61; 29/527.1

(56) References Cited

U.S. PATENT DOCUMENTS

| | | | | |
|---|---|---|---|---|
| 3,845,181 A | * | 10/1974 | Ravault | 264/628 |
| 3,946,039 A | * | 3/1976 | Walz | 264/628 |
| 4,659,528 A | * | 4/1987 | Plowman et al. | 264/49 |
| 5,034,422 A | | 7/1991 | Triolo et al. | 521/52 |
| 5,958,314 A | * | 9/1999 | Draenert | 264/42 |
| 6,146,892 A | | 11/2000 | Ma et al. | 435/399 |
| 6,281,257 B1 | | 8/2001 | Ma et al. | 521/61 |

FOREIGN PATENT DOCUMENTS

FR 1456693 7/1968

OTHER PUBLICATIONS

"Generation of neo–tendon using synthetic polymers seeded with tenocytes," Cao, Y, J. Vacanti, P.X. Ma, K. Paige, J. Upton, Z. Chowanski, B. Schloo, R. Langer and C. Vacanti *Transplant Proc* 26(6), 3390–3392 (1994).

"Biodegradable woven/nonwoven composite scaffolds for pulmonary artery engineering in a juvenile lamb model," Ma, P.X., T. Shin'oka, T. Zhou, D. Shum–Tim, J. Lien, J .P. Vacanti, J. Mayer and R. Langer, *Transactions of the Society for Biomaterials*, 20:295 (1997).

"Fabrication of biodegradable polymer foams for cell transplantation and tissue engineering," Ma, P.X. and R. Langer, *Tissue Engineering Methods and Protocols*, M. Yarmush and J. Morgan, Editors, (1998) Humana Press Inc., Totowa, NJ, pp. 47–56.

(List continued on next page.)

*Primary Examiner*—Allan R. Kuhns
(74) *Attorney, Agent, or Firm*—Dierker & Glassmeyer, P.C.

(57) ABSTRACT

3-D biodegradable porous, polymer (natural or synthetic) scaffolds with well-controlled, interconnected pores, and method for forming the porous materials. Hydrophilic and/or hydrophobic porogen materials were fabricated into 3-D negative replicas of the desired macroporous architectures. Biodegradable polymers (PLLA and PLGA) were dissolved in a solvent and cast onto the negative replica. After dissolving/leaching out the porogen materials, a porous polymer scaffold was formed. The skeletal structure of PLLA foams consisted of small platelets or nano-fibers, while PLGA foams had homogeneous skeletal structure. To improve the cell seeding, distribution, mass transport, and new tissue organization and vascularization, 3-D macroporous architectures are built in the nano-fibrous matrices. The method tailors polymer scaffolds for a variety of potential tissue engineering applications due to the well-controlled architecture, inter-pore connectivity, and mechanical properties.

37 Claims, 15 Drawing Sheets

OTHER PUBLICATIONS

"Degradation, structure and properties of fibrous nonwoven poly(glycolic acid) scaffolds for tissue engineering," Ma, P.X. and R. Langer, *Polymers in Medicine and Pharmacy,* A.G. Mikos, K.W. Leong, M.L. Radomsky, J.A. Tamada and M.J. Yaszemski, Editors, (1995) Mat. Res. Soc., Pittsburgh, 99–104.

"The effect of donor and recipient age on engraftment of tissue engineered liver," Cusick, R.A., H. Lee, K. Sano, J.M.. Pollok, H. Utsunomiya, P.X. Ma, R. Langer and J. P. Vacanti, *Journal of Pediatric Surgery* 32(2), 357–60 (1997).

"Poly (alpha–hydroxy acids)/hydroxyapatite porous composites for bone tissue engineering: I. Preparation and morphology," Zhang, R. and P.X. Ma, *Journal of Biomedical and Materials Research* 44(4), 446–455 (1999).

"Porous poly(L–lactic acid)/apatite composites created by biomimetic process," Zhang, R. and P.X. Ma, *Journal of Biomedical Materials Research* 45(4), 285–293 (1999).

Benya, P. and J. Shaffer, "Dedifferentiated chondrocytes reexpress the differentiated collagen phenotype when cultured in agarose gels," *Cell* 30(1):215–224 (1982).

Cao, Y., J.P. Vacanti, K.T. Paige, J. Upton and C.A. Vacanti, "Transplantation of chondrocytes utilizing a polymer–cell construct to produce tissue–engineered cartilage in the shape of a human ear," *Plastic & Reconstructive Surgery* 100(2), 303–04 (1997).

Fischer, E.W., H.J. Sterzel and G. Wegner, "Investigation of the structure of solution grown crystals of lactide copolymers by means of chemical reactions," *Kolloid–Zeitschrift and Zeitschrift für Polymere* 251:980–990 (1973).

Folkman, J. and A. Moscona, "Role of cell shape in growth control," *Nature* 273(5661):345–349 (1978).

Freed, L.E., R. Langer, I. Martin, N.R. Pellis and G. Vunjak–Novakovic, "Tissue engineering of cartilage in space," *Proceedings of the National Academy of Sciences of the United States of America* 94(25), 13885–13890 (1997).

Grinnell, F. and M.H. Bennett, "Ultrastructural studies of cell—collagen interactions," *Methods in Enzymology* 82 Pt A:535–544 (1982).

Hubbell, J.A., "Biomaterials in Tissue Engineering," *Bio/Technology* 13:565–576 (1995).

Ishaug–Riley S.L., G.M. Crane–Kruger, M.J. Yaszemski and A.G. Mikos, "Three–dimensional culture of rat calvarial osteoblasts in porous biodegradable polymers," *Biomaterials* 19(15), 1405–12 (1998).

Jamshidi K., S.H. Hyon and Y. Ikada, "Thermal Characterization of Polylactides," *Polymer* 29(12):2229–2234 (1988).

Kim, S.S., H. Utsunomiya, J.A. Koski, B.M. Wu, M.J. Cima, J. Sohn, K. Mukai, L.G. Griffith and J.P. Vacanti, "Survival and function of hepatocytes on a novel three–dimensional synthetic biodegradable polymer scaffold with an intrinsic network of channels," *Annals of Surgery* 228(1):8–13 (1998).

Langer R., "Selected advances in drug delivery and tissue engineering," *Journal of Controlled Release,* 62(1–2):7–11 (1999).

Langer, R.S. and J.P. Vacanti, "Tissue engineering: the challenges ahead," *Scientific American* 280(4), 86–89 (1999).

Lo, H., S. Kadiyala, S.E. Guggino and K.W. Leong, "Poly(L–lactic acide) foams with cell seeding and controlled–release capacity," *J Biomed Mater Res* 30(4), 475–484 (1996).

Ma, P.X. and R. Zhang, "Synthetic nano–scale fibrous extracellular matrix," *Journal of Biomedical Materials Research* 46(1):60–72 (May 3, 1999).

Ma, P.X., B. Schloo, D. Mooney and R. Langer, "Development of biomechanical properties and morphogenesis of in vitro tissue engineered cartilage," *J Biomed Mater Res* 29(12), 1587–1595 (1995).

Ma, P.X. and R. Langer, "Morphology and mechanical function of long–term in vitro engineered cartilage," *Journal of Biomedical Materials Research* 44(2),217–221 (1999).

Mikos, A.G, A.J. Thorsen, L.A. Czerwonka, Y. Bao, R. Langer, D.N. Winslow and J.P. Vacanti, "Preparation and characterization of poly(L–lactic acid) foams," *Polymer* 35(5), 1068–1077 (1994).

Mikos, A., M. Lyman, L. Freed and R. Langer, "Wetting of poly(L–lactic acid) and poly(DL–lactic–co–glycolic acid) foams for tissue culture," *Biomaterials* 15(1):55–58 (1994).

Niklason, L.E., J. Gao, W.M. Abbott, K.K. Hirschi, S. Houser, R. Marini and R. Langer, "Functional arteries grown in vitro," *Science* 284(5413), 489–493 (1999).

Palecek, S.P., J.C. Loftus, M.H. Ginsberg, D.A. Lauffenburger and A.F. Horwitz, "Integrin–ligand binding properties govern cell migration speed through cell–substratum adhesiveness," [published erratum appears in *Nature* Jul. 10, 1997; 388(6638):210], *Nature* (1997) 385(6616):537–540.

Rodriguez, A., Y.L. Cao, C. Ibarra, S. Pap, M. Vacanti, R.D. Eavey and C.A. Vacanti, "Characteristics of cartilage engineered from human pediatric auricular cartilage," *Plastic & Reconstructive Surgery* 103(4):1111–1119 (1999).

Saltzman, W.M., "Cell Interactions with Polymers," *Principles of Tissue Engineering,* R. Lanza, R. Langer and W. Chick, Editors (1997) Academic Press, R.G. Landes Company, Austin, Texas, 225–46.

Shinoka, T., D. Shum–Tim, P.X. Ma, R.E. Tanel, N. Isogai, R. Langer, J.P. Vacanti and J.E. Mayer, Jr., "Creation of viable pulmonary artery autografts through tissue engineering," *Journal of Thoracic & Cardiovascular Surgery* 115(3), 536–46 (1998).

Strom, S.C. and G. Michalopoulos, "Collagen as a substrate for cell growth and differentiation," *Methods in Enzymology* 82 Pt A:544–555 (1982).

Thomson, R.C., A.G. Mikos, E. Beahm, J.C. Lemon, W.C. Satterfield, T.B. Aufdemorte and M.J. Miller, "Guided tissue fabrication from periosteum using preformed biodegradable polymer scaffolds," *Biomaterials* 20(21):2007–2018 (1999).

Wintermantel E., J. Mayer, J. Blum, K.L. Eckert, P. Luscher and M. Mathey, "Tissue engineering scaffolds using superstructures," *Biomaterials* 17(2):83–91 (1996).

Yannas, I.V., "Applications of ECM analogs in surgery," *Journal of Cellular Biochemistry* 56(2):188–191 (1994).

Elsdale, T. and J. Bard, "Collagen substrata for studies on cell behavior," *Journal of Cell biology* 54(3):626–637 (1972).

Ibarra, C., C. Jannetta, C.A. Vacanti, Y. Cao, T.H. Kim, J. Upton and J.P. Vacanti, "Tissue engineered meniscus: a potential new alternative to allogeneic meniscus transplantation," *Transplantation Proceedings* 29(1–2), 986–88 (1997).

Langer, R. and J. Vacanti, "Tissue engineering," *Science* 260(5110), 920–926 (1993).

Vacanti, C.A. and L.J. Bonassar, "An overview of tissue engineered bone," *Clinical Orthopaedics & Related Research* (367 Suppl), S375–S381 (1999).

Reed, J.S., "Particle packing characteristics," *Principles of ceramics processing,* J.S. Reed, Editor, (1995) John Wiley & Sons, Inc., New York, 215–230.

Park, A., B. Wu and L.G. Griffith, "Integration of surface modification and 3D fabrication techniques to prepare patterned poly(L-lactide) substrates allowing regionally selective cell adhesion," *Journal of Biomaterials Science, Polymer Edition* 9(2), 89–110 (1998).

Nerem, R.M. and A. Sambanis, "Tissue Engineering: From Biology to Biological Substitutes," *Tissue Engineering* 1(1):3–13 (1995).

Shinoka, T., P.X. Ma, D. Shum–Tim, C.K. Breuer, R.A. Cusick, G. Zund, R. Langer, J.P. Vacanti and J.E. Mayer, Jr., "Tissue–engineered heart valves, Autologous valve leaflet replacement study in a lamb model," *Circulation* 94(Suppl II), pp. II–164–II–167 (1996).

* cited by examiner

REVERSE FABRICATION OF POROUS MATERIALS

CROSS-REFERENCE TO RELATED APPLICATIONS

This application claims the benefit of U.S. Provisional Application Ser. No. 60/203,973, filed May 12, 2000.

BACKGROUND OF THE INVENTION

The present invention relates generally to methods for fabricating porous materials, and more particularly to such methods using a reverse fabrication technique, utilizing a three-dimensional negative replica formed from a porogen material. The resulting variety of inventive porous materials may be used for many different applications such as tissue engineering scaffolds, cell culture matrices, controlled release matrices, wound dressings, separation membranes, column fillers of chromatography, filters, packaging and insulating materials, and so forth.

Engineering tissues and organs with mammalian cells and a scaffolding material is a new approach compared to the use of harvested tissues and organs. See Langer, R. S. and J. P. Vacanti, "Tissue engineering: the challenges ahead," *Scientific American* 280(4), 86 (1999). In the tissue engineering approach, the scaffold plays a pivotal role in cell seeding, proliferation, and new tissue formation in three dimensions. See Langer, R. and J. Vacanti, "Tissue engineering," *Science* 260(5110), 920–926 (1993); Hubbell, J. A., "Biomaterials in Tissue Engineering," *Bio/Technology* 13, 565 (1995); and Saltzman, W. M., "Cell Interactions with Polymers," *Principles of Tissue Engineering*, R. Lanza, R. Langer and W. Chick, Editors, (1997) Academic Press, R. G. Landes Company, Austin, Tex., 225. Biodegradable polymers have been attractive candidates for scaffolding materials because they degrade as the new tissues are formed, eventually leaving nothing foreign to the body. See Ma, P. X. and R. Langer, "Degradation, structure and properties of fibrous nonwoven poly(glycolic acid) scaffolds for tissue engineering," *Polymers in Medicine and Pharmacy*, A. G. Mikos, K. W. Leong, M. L. Radomsky, J. A. Tamada and M. J. Yaszemski, Editors, (1995) MRS, Pittsburgh, 99–104. A few techniques such as salt-leaching (see Mikos, A. G., A. J. Thorsen, L. A. Czerwonka, Y. Bao, R. Langer, D. N. Winslow and J. P. Vacanti, "Preparation and characterization of poly(l-lactic acid) foams," *Polymer* 35(5), 1068–1077 (1994); and Ma, P. X. and R. Langer, "Fabrication of biodegradable polymer foams for cell transplantation and tissue engineering," *Tissue Engineering Methods and Protocols*, M. Yarmush and J. Morgan, Editors, (1998) Humana Press Inc., Totowa, N.J.), fibrous fabric processing, 3-D printing (see Park, A., B. Wu and L. G. Griffith, "Integration of surface modification and 3D fabrication techniques to prepare patterned poly(L-lactide) substrates allowing regionally selective cell adhesion," *Journal of Biomaterials Science Polymer Edition* 9(2), 89–110 (1998)), and phase-separation (see Zhang, R. and P. X. Ma, "Poly (alpha-hydroxy acids)/hydroxyapatite porous composites for bone tissue engineering: 1. Preparation and morphology," *Journal of Biomedical Materials Research* 44(4), 446–455 (1999); Zhang, R. and P. X. Ma, "Porous poly(L-lactic acid)/apatite composites created by biomimetic process," Journal of Biomedical Materials Research 45(4), 285–293 (1999); Ma, P. X. and R. Zhang, "Synthetic nano-scale fibrous extracellular matrix," *Journal of Biomedical Materials Research* 46(1):60–72 (May 3, 1999); and Lo, H., S. Kadiyala, S. E. Guggino and K. W. Leong, "Poly(L-lactic acid) foams with cell seeding and controlled-release capacity," *J Biomed Mater Res* 30(4), 475–484 (1996)) have been developed to generate highly porous polymer scaffolds for tissue engineering.

These scaffolds have shown great promise in the research of engineering a variety of tissues. See, for example, Vacanti, C. A. and L. J. Bonassar, "An overview of tissue engineered bone," *Clinical Orthopaedics & Related Research* (367 Suppl), S375 (1999); Freed, L. E., R. Langer, I. Martin, N. R. Pellis and G. Vunjak-Novakovic, "Tissue engineering of cartilage in space," *Proceedings of the National Academy of Sciences of the United States of America* 94(25), 13885–13890 (1997); Ma, P. X., B. Schloo, D. Mooney and R. Langer, "Development of biomechanical properties and morphogenesis of in vitro tissue engineered cartilage," *J Biomed Mater Res* 29(12), 1587–1595 (1995); Ma, P. X. and R. Langer, "Morphology and mechanical function of long-term in vitro engineered cartilage," *Journal of Biomedical Materials Research* 44(2), 217–221 (1999); Cao, Y., J. Vacanti, X. Ma, K. Paige, J. Upton, Z. Chowanski, B. Schloo, R. Langer and C. Vacanti, "Generation of neo-tendon using synthetic polymers seeded with tenocytes," *Transplant Proc* 26(6), 3390–3392 (1994); Ibarra, C., C. Jannetta, C. A. Vacanti, Y. Cao, T. H. Kim, J. Upton and J. P. Vacanti, "Tissue engineered meniscus: a potential new alternative to allogeneic meniscus transplantation," *Transplantation Proceedings* 29(1–2), 986 (1997); Cusick, R. A., H. Lee, K. Sano, J. M. Pollok, H. Utsunomiya, P. X. Ma, R. Langer and J. P. Vacanti, "The effect of donor and recipient age on engraftment of tissue engineered liver," *Journal of Pediatric Surgery* 32(2), 357 (1997); Shinoka, T., P. X. Ma, D. Shum-Tim, C. K. Breuer, R. A. Cusick, G. Zund, R. Langer, J. P. Vacanti and J. E. Mayer, Jr., "Tissue-engineered heart valves, Autologous valve leaflet replacement study in a lamb model," *Circulation* 94(9 Suppl), 11–164–168 (1996); Shinoka, T., D. Shum-Tim, P. X. Ma, R. E. Tanel, N. Isogai, R. Langer, J. P. Vacanti and J. E. Mayer, Jr., "Creation of viable pulmonary artery autografts through tissue engineering," *Journal of Thoracic & Cardiovascular Surgery* 115(3), 536 (1998); Niklason, L. E., J. Gao, W. M. Abbott, K. K. Hirschi, S. Houser, R. Marini and R. Langer, "Functional arteries grown in vitro," *Science* 284(5413), 489–493 (1999); Cao, Y., J. P. Vacanti, K. T. Paige, J. Upton and C. A. Vacanti, "Transplantation of chondrocytes utilizing a polymer-cell construct to produce tissue-engineered cartilage in the shape of a human ear," *Plastic & Reconstructive Surgery* 100(2), 297 (1997); and my co-pending patent application entitled, "Porous Composite Materials," U.S. Ser. No. 09/292,896, filed Apr. 27, 1999.

However, to engineer clinically useful tissues and organs is still a challenge. The understanding of the principles of scaffolding is far from satisfactory, and "ideal" scaffolds are yet to be developed.

Pore size, porosity, and surface area (surface-to-volume ratio) are widely recognized as important parameters for a scaffold for tissue engineering. See Ishaug-Riley S. L., G. M. Crane-Kruger, M. J. Yaszemski and A. G. Mikos, "Three-dimensional culture of rat calvarial osteoblasts in porous biodegradable polymers," *Biomaterials* 19(15), 1405 (1998). Other architectural features such as pore shape, pore wall morphology, and interconnectivity between pores of the scaffolding materials are also suggested to be important for cell seeding, migration, growth, mass transport, gene expression and new tissue formation in three dimensions.

In the body, tissues are organized into three-dimensional structures as functional organs and organ systems. Each tissue or organ has its specific characteristic architecture depending on its biological function. This architecture is also believed to provide appropriate channels for mass transport and spatial cellular organization. Mass transport includes signaling molecules, nutritional supplies, and metabolic waste removal. Spatial cellular organization determines cell—cell and cell-matrix interactions, and is critical to the normal tissue and organ function. To engineer a tissue or organ with a specific function, a matrix material (natural or synthetic) plays a critical role in allowing for the appropriate cell distribution and in guiding the tissue regeneration in three-dimensions. Therefore, to develop a scaffold for tissue engineering, the architectural design concerning the spatial cellular distribution, mass transport conditions, and tissue function is very important.

A few methods have been developed to produce porous scaffolds for tissue engineering. See Langer R., "Selected advances in drug delivery and tissue engineering," *Journal of Controlled Release*, 62(1–2):7–11 (1999); Ma, P. X., T. Shin'oka, T. Zhou, D. Shum-Tim, J. Lien, J. P. Vacanti, J. Mayer and R. Langer, "Biodegradable woven/nonwoven composite scaffolds for pulmonary artery engineering in a juvenile lamb model," *Transactions of the Society for Biomaterials*, 20:295 (1997); Yannas, I. V., "Applications of ECM analogs in surgery," *Journal of Cellular Biochemistry* 56(2):188–191 (1994). The salt-leaching technique is a popular procedure to fabricate scaffolds from biodegradable polymers. See Thomson, R. C., A. G. Mikos, E. Beahm, J. C. Lemon, W. C. Satterfield, T. B. Aufdemorte and M. J. Miller, "Guided tissue fabrication from periosteum using preformed biodegradable polymer scaffolds," *Biomaterials* 20(21):2007–2018 (1999). With this technique, the pore size can be controlled by the salt particle size, and the porosity can be controlled by the salt/polymer ratio. The pore shape is, however, limited to the cubic salt crystal shape. Textile technologies have been utilized to create woven (knit) and nonwoven fibrous scaffolds for tissue engineering applications. See Wintermantel E., J. Mayer, J. Blum, K. L. Eckert, P. Luscher and M. Mathey, "Tissue engineering scaffolds using superstructures," *Biomaterials* 17(2):83–91 (1996). The fiber diameter can be controlled at the micrometer level (typically around 15 microns), and the inter-fiber distance and porosity can also be manipulated to a certain extent with the processing variables. However, further lowering of the fiber diameter is limited with the textile technologies.

Thus, it is an object of the present invention to provide a method for forming a porous natural or synthetic material which advantageously has a designed and well-controlled macroporous architecture. It is a further object of the present invention to provide such a porous material which advantageously has substantially completely interconnected pores. Yet further, it is an object of the present invention to provide a method for forming an organized porous structure which advantageously avoids methods conventionally used to form random pore shapes and/or arrangements. It is yet a further object of the present invention to provide a method for forming, as well as the resultant porous material having a complex geometry which may advantageously incorporate random geometrically shaped materials into well-designed and controlled three-dimensional configurations.

SUMMARY OF THE INVENTION

The present invention addresses and solves the above-mentioned problems and meets the enumerated objects and advantages, as well as others not enumerated, by providing a method for forming a designed and well-controlled porous natural or synthetic material. The method comprises the step of casting a natural or synthetic composition onto a negative replica of a desired macroporous architecture of the porous material, thereby forming a body, the negative replica having been formed from a predetermined three-dimensional configuration of shaped porogen materials. The method further comprises the step of removing the porogen materials from the body, thereby forming the porous material having the desired macroporous architecture.

BRIEF DESCRIPTION OF THE DRAWINGS

Other objects, features and advantages of the present invention will become apparent by reference to the following detailed description and drawings, in which.

DETAILED DESCRIPTION OF THE PREFERRED EMBODIMENTS

Figure 1A:
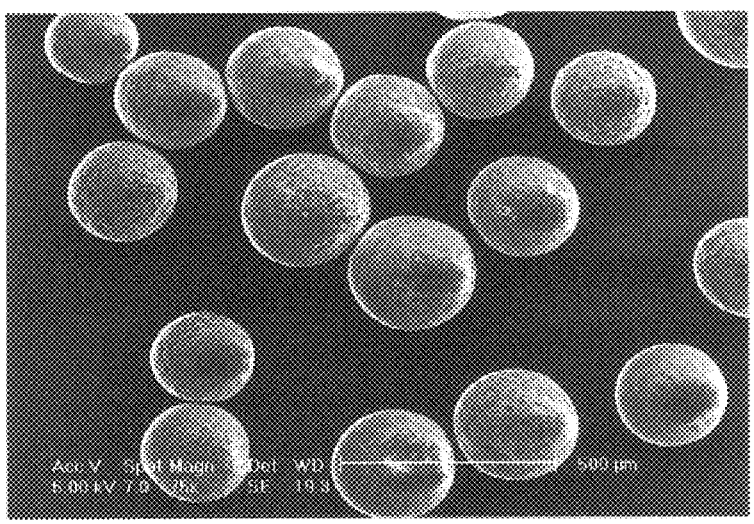
FIG. 1A is a SEM micrograph of spherically shaped paraffin spheres at 75× magnification.

This invention includes methods and compositions to fabricate polymer materials into designed and well-controlled porous materials.

A method of the present invention for forming a porous material comprises the step of casting a natural or synthetic composition onto a negative replica of a desired macroporous architecture of the porous material, thereby forming a body, the negative replica having been formed from a predetermined three-dimensional configuration of shaped porogen materials. It is to be understood that the natural or synthetic composition may include a liquid. Preferably, the natural or synthetic composition when cast is at least one of a solution, a melt, a slurry, flowable powders, flowable pastes, and mixtures thereof. It is to be understood that the natural or synthetic composition may be any composition which flows adequately for casting purposes. In one preferred embodiment, the liquid is a solvent, and the natural or synthetic composition is a polymeric composition. In an alternate preferred embodiment, the natural or synthetic composition comprises a material selected from the group consisting of ceramics, glass, inorganic compounds, and mixtures thereof.

The method further comprises the step of removing the porogen materials from the body, thereby forming the porous material having the desired macroporous architecture.

It is to be understood that the method of the present invention may be performed continuously (eg. it may be automated wherein the porogen is used to print the 3-D negative replica structure, and the casting material is cast onto the negative replica) or in batches (manually or automatically).

Some exemplary porogen materials suitable for use in the present invention are selected from the group consisting of salts (including, but not limited to sodium chloride, potassium chloride, sodium fluoride, potassium fluoride, sodium iodide, sodium nitrate, sodium sulfate, sodium iodate, and mixtures thereof), other water soluble chemicals such as sodium hydroxide, sugars (including, but not limited to saccharin, glucose, fructose, other water soluble sugars, and mixtures thereof), waxes (paraffin, beeswax, other waxes, and mixtures thereof), gelatins, naphthalene, natural or synthetic water soluble polymers, natural or synthetic non-water soluble polymers, degradable polymers, non-degradable polymers, partially degradable polymers, and mixtures thereof.

It is to be understood that the porogen materials may be formed into any shape as desired and/or necessary. However, in the preferred embodiment, the predetermined shape is selected from the group consisting of cubic or other geometrically shaped crystals, spheres, fibers, discs, regular geometric shapes, irregular geometric shapes, and mixtures thereof.

The natural or synthetic composition for casting on the porogen structure may be selected from any suitable material which retains its cast shape during the process for removing the porogen material from the body. For example, if the porogen is to be removed by dissolution in a solvent, and the porogen chosen is soluble in water, the casting material chosen should desirably be substantially insoluble in water.

Some exemplary casting materials suitable for use in the present invention are selected from the group consisting of natural or synthetic hydrophilic polymers, natural or synthetic hydrophobic polymers, natural or synthetic amphophilic polymers, degradable polymers, non-degradable polymers, partially degradable polymers, proteins, artificial proteins, and mixtures thereof.

Some polymeric casting compositions of choice are selected from the group consisting of poly(lactide-co-glycolide) (PLGA), poly(lactide) (PLLA), polyglycolic acid (PGA), polyanhydrides, poly(ortho ethers), polycaprolactone, polyethylene glycol (PEG), polyurethane, copolymers thereof, and mixtures thereof.

Some exemplary, non-limitative water soluble (hydrophilic) polymers suitable for use in the present invention include polyacrylic acid, polyvinyl alcohol, polyethylene oxide, polyethylene glycol, polymethacrylic acid (PMM), alginates, collagens, gelatins, hyaluronic acid, and mixtures thereof.

Some exemplary, non-limitative water insoluble (hydrophobic) polymers suitable for use in the present invention include poly(methyl methacrylate) (PMMA), polycarbonate, polypropylene oxide (PPO), polyamides, polyvinylidene fluoride (PVDF), polybutylene, polyacrylonitrile, and mixtures thereof.

Some exemplary, non-limitative degradable polymers (which may or may not be water soluble) suitable for use in the present invention include polyamino acids.

A porous foam according to the present invention comprises substantially regular, interconnected pores, the pores having walls. The inventive foam may further comprise the pore walls having at least one of a solid structure, a nanofibrous structure, a platelet structure, and a microporous structure. It is to be understood that the foam may be formed from any of the casting materials described herein as being suitable for the present invention.

The methods of the present invention are versatile. As enumerated hereinabove, the polymers of choice may be hydrophilic, hydrophobic or amphophilic. The polymers may be degradable, non-degradable, or partially degradable. The resulting variety of porous materials may advantageously and fortuitously be used for many different applications such as tissue engineering scaffolds, cell culture matrices, controlled release matrices, wound dressings, separation membranes, column fillers of chromatography, filters, packaging and insulating materials, and so forth.

The methods of the present invention include the creation of porogen materials (pore generating materials), and their assembly into a series of 3-D structures. Some illustrative (non-limitative) examples of the polymer materials (PLGA and PLLA), porogen materials (salt, sugar, paraffin (wax)), porogen geometrical components (cubic or other shaped crystals, spheres, fibers, discs, and their combinations), and the different ways of their assemblies in 3-D are disclosed herein. However, it is to be understood that these examples are not intended to be exhaustive. It is contemplated as being within the purview of the present invention to include other polymers, porogen materials, porogen geometries, different ways of assemblies, and different fabrication methods of the porogen architectures.

These 3-D porogen assemblies serve as negative replicas of "macroporous" architectures of the foams. Polymer solutions (or melts) are cast on these porogen assemblies (generally in a mold, or the porogen assembly itself may be a self-contained mold) to form polymer/porogen constructs.

The polymer solution (or melt) may be made of a single polymer or a mixture of polymers. The polymers may be homopolymers or copolymers (containing two or more repeating units). The polymers may be degradable polymers as exemplified herein, nondegradable polymers, a mixture of both degradable and nondegradable polymers, or partially degradable polymers for certain other applications. The polymers may also be polymerized from a monomer or monomers with other desired chemicals in the mold containing the porogen assembly. The polymers can also be crosslinked in situ.

Other materials (non-polymeric) and agents (functional, eg. bioactive, or inert) may also be added into the polymer systems if desired. These additives may comprise inorganic salts, minerals, drugs, peptides, and so forth.

The porogen may be organic, inorganic, or even polymeric. The solvent for the polymer(s) may be a single solvent or a mixture of solvents. The porogen is then dissolved away with a different solvent/solvents (organic or aqueous, but a non-solvent of the polymer) to form the porous polymer materials. The porogen may also be removed by other means such as melting, evaporation, sublimation, and/or other suitable means.

One of the important features of this invention is the assembly of porogen components into a predesigned 3-D "macroporous" architecture. The porogen assembly can be constructed either manually or with certain fabrication machines or equipment such as freeform, 3-D printing, lithography and so on.

Another important feature includes the possible manipulations of the polymer skeleton of the foams. Certain manipulations such as phase separation, gelation, or chemical reaction can be utilized to make complex structures of the polymer portion such as the formation of micro/nano features (nano-fibers, micropores, platelets, and so forth).

Since either organic or aqueous solvents may be used to dissolve certain porogen materials as demonstrated herein, water soluble or organic solvent soluble polymers or mixtures thereof may be used to make the foams.

Herein there is disclosed the development of a novel technique to generate well-controlled inter-connected spherical or partially spherical (hollow shell or partial shell) macropores in biodegradable polymer scaffolds.

To mimic the fine fibrous architecture of collagen (a natural extracellular matrix component), a novel phase separation technique has been developed to generate synthetic nano-fibrous extracellular matrix. This phase separation technique is disclosed in my U.S. Pat. No. 6,146,892, issued Nov. 14, 2000, which is incorporated by reference herein in its entirety. The diameter of the fibers ranges from 50 to 500 nanometers, which is the same as that of collagen matrix. See Elsdale, T. and J. Bard, "Collagen substrata for studies on cell behavior," *Journal of Cell biology* 54(3):626–637 (1972); and Hay E. D., "Cell Biology of Extracellular Matrix," 2nd ed. (1991).

These synthetic nano-fibrous matrices circumvent the concerns of pathogen transmission and immuno-rejection associated with collagen from animal and cadaver sources. The surface-to-volume ratio of these synthetic nano-fibrous matrices is hundreds to thousands of times higher than those of the nonwoven scaffolds fabricated with the textile technologies or foams fabricated with the salt-leaching techniques described in my U.S. Pat. No. 6,146,892 cited hereinabove. It has been found that high surface-to-volume ratio enhances cell adhesion. Cell migration, proliferation and differentiated function are also dependent on the cell adhesion for many cell types. See Palecek, S. P., J. C. Loftus, M. H. Ginsberg, D. A. Lauffenburger and A. F. Horwitz, "Integrinligand binding properties govern cell migration speed through cell-substratum adhesiveness," [published erratum appears in *Nature* (1997) July 10; 388(6638):210], *Nature* (1997) 385(6616):537–540; Folkman, J. and A. Moscona, "Role of cell shape in growth control," *Nature* 273(5661):345–349 (1978); and Benya, P. and J. Shaffer, "Dedifferentiated chondrocytes reexpress the differentiated collagen phenotype when cultured in agarose gels," *Cell* 30(1):215–224 (1982). Therefore, the nano-fibrous scaffolds may serve as a better environment for cell attachment, proliferation, and function.

To improve the three-dimensional structure of the nano-fibrous scaffolds for cell seeding, distribution, mass transport, and tissue organization, the building of predesigned macroporous architectures in the nano-fibrous matrices is disclosed herein.

To further illustrate the composition, the following examples are given. It is to be understood that these examples are provided for illustrative purposes and are not to be construed as limiting the scope of the present invention.

EXAMPLE 1

Poly(lactide) (PLLA) and poly(lactide-co-glycolide) (85/15) (PLGA85/15) were purchased from Boehringer Ingelheim (Ingelheim, Germany). Poly(vinyl alcohol) (PVA) with a molecular weight of 25,000 and paraffin with a melting point of 53–57° C. were purchased from Fisher Scientific (Pittsburgh, Pa.). Pyridine, hexane and cyclohexane were purchased from Aldrich (Milwaukee, W. Va.). U.S. standard sieves (100 μm, 250 μm, 350 μm, 420 μm and 500 μm) were purchased from Newark Wire Cloth Company (Newark, N.J.).

Preparation of Paraffin Spheres

PVA was dissolved in distilled water to make a 0.5% (g/ml) solution. The PVA solution was heated to 60–70° C. Paraffin was heated to melt in a glass vial on a hot plate and was added to the PVA solution. The mixture was vigorously stirred with a magnetic stirring bar. Icy cold water was poured into the stirred suspension to solidify the paraffin spheres. The suspension containing the paraffin spheres was then poured into a sieve with an opening of 100 μm to sift out the paraffin particles smaller than 100 μm. The paraffin spheres were then washed with distilled water for 3 to 5 times to remove the residual PVA. After being dried in air for one week, the spheres were sifted with U.S. standard sieve series (100 μm, 250 μm, 350 μm, 420 μm and 500 μm) to separate them into different size ranges. The paraffin spheres with the desired sizes were collected and stored in a desiccator until use.

Preparation of Polymer Foam

The paraffin spheres (0.5±0.05 g) were added in a TEFLON mold (cylindrical vial with a diameter of 18 mm). The top surface of the paraffin spheres was leveled by tapping the mold on a leveled flat metal plate with three adjustable legs. The mold containing paraffin spheres was then carefully moved into an oven (preheated to 37° C.), kept for 20 minutes, and then cooled down to room temperature. A chosen polymer was dissolved in pyridine to prepare a solution of a desired concentration. 0.40 ml of the polymer solution were cast onto the paraffin sphere assembly drop by drop. The mold containing the paraffin sphere assembly and the polymer solution was first maintained under low vacuum (an air pressure of 60 mm Hg) to remove the air trapped inside the paraffin sphere assembly. Trapped air appeared as bubbles on the top surface. When no more bubbles were observed, the high vacuum (an air pressure <0.5 mm Hg) was used to evaporate the solvent for 2 (PLLA) or 7 days (copolymers). Additional casting and vacuum drying were repeated to produce foams with higher polymer contents (lower porosity).

The dried paraffin/polymer discs were removed from the TEFLON mold, and the top layer was cut away with a razor blade to obtain a flat surface. The discs were immersed in 200 ml hexane to dissolve the paraffin at room temperature for two days. The hexane was changed three times a day. The hexane was then exchanged with cyclohexane and the discs were frozen in a freezer (−20° C.) for more than 6 hours. The frozen foams were freeze-dried in an ice bath for two days to remove cyclohexane, and they were further dried at room temperature under vacuum for 1 week to completely remove the solvent. The foams were kept in a desiccator until characterization.

Characterization

The density and the porosity of the foams were determined by measuring the dimensions and the mass of the foam, by method(s) disclosed in my U.S. Pat. No. 6,146,892 cited hereinabove. The skeletal density of the foam, ρ, was calculated as:

$$\rho = \frac{4m}{\pi d^2 h}$$

where m was the mass, d was the diameter and h was the thickness of the foam. The porosity, ϵ, was calculated as:

$$\epsilon = \frac{1-\rho}{\rho_P}$$

where $\rho_{92}$ is the density of the polymer. For PLLA foam, $\rho_\rho$ was determined by:

$$\rho_P = \frac{1}{\frac{(1-X_C)}{\rho_a} + \frac{X_C}{\rho_c}}$$

where $X_c$ was the crystallinity of the polymer, $\rho_a$ was the density of the amorphous region (1.25 g/ml) and PC was the density of the crystalline region (1.29 g/ml). Xc was given by $$X_c = \frac{\Delta H_m}{\Delta H^\circ_m}$$

where $\Delta H_m$ was the enthalpy of melting measured with a differential scanning calorimeter (DSC) and $\Delta H^\circ_m$ was the enthalpy of melting for 100% crystalline polymer (203.4 J/g).

Scanning electron microscopy (SEM) (S-3200N, Hitachi, Japan) was used at 5 kV to examine the morphology. In sample preparation, paraffin/polymer specimens were cut into halves with a razor blade before paraffin was leached out. The paraffin assembly provided the specimens with enough strength to maintain the morphological structure during the cutting. The paraffin was then leached out with hexane and cyclohexane to reveal the porous morphology. The prepared foams were coated with gold using a sputter coater (Desk-II, Denton Vacuum Inc.). The gas pressure, the current and the coating time were 50 mtorr, 40 mA and 200 seconds, respectively.

The overall three-dimensional arrangement of the pores inside the foam was studied with optical microscopy (Nikon, Model SMZ-2T). The sample was placed on a semi-transparent stage, and the light source was below the foam so that the pores were the lighter areas on the image due to the higher transmittance of light.

The compressive modulus values of the foams were measured with an Instron 4502 mechanical tester (Instron Co., Canton, Mass.). The specimens were porous discs (~17 mm in diameter and ~3 mm in thickness). The crosshead speed was 0.5 mm/min. The modulus was determined with the initial slope of the stress-strain curve (strain range: 3–8%). When the moduli of different foams were compared, a two-tail Student t test (assuming unequal variances) was performed to determine the statistical significance ($p<0.05$).

Results

Figure 1B:
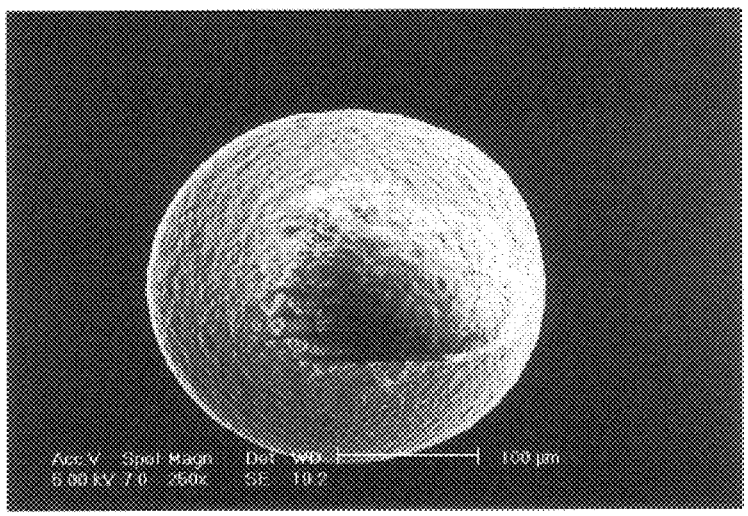
FIG. 1B is a SEM micrograph of spherically shaped paraffin spheres at 250× magnification.
Figure 1C:
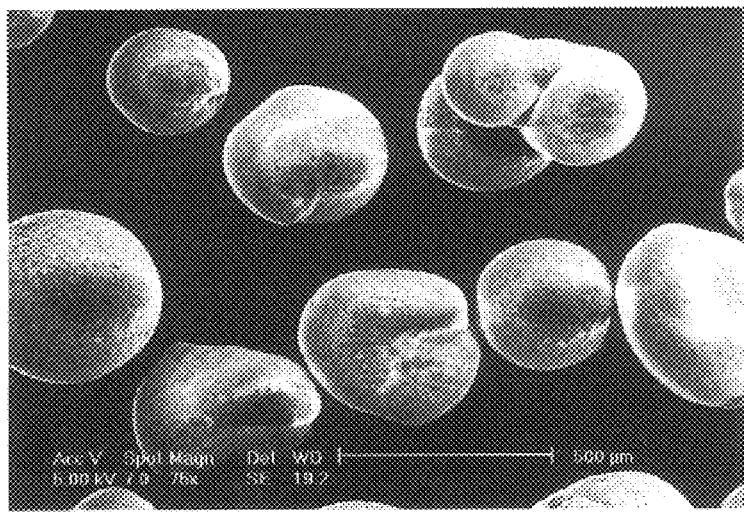
FIG. 1C is a SEM micrograph of asymmetrically shaped paraffin spheres at 75× magnification.

Mechanical stirring and subsequent quenching of the paraffin suspension with ice water produced uniform spherical paraffin particles (FIGS. 1A & 1B). The size of the spheres was controlled in the range of 100–500 $\mu$m, with the maximum yield at around 300 $\mu$m. The stirring rate and the concentration of the PVA solution were important in controlling the size distribution and the shape of the spheres. Faster stirring rate and higher concentration of the PVA solution resulted in smaller particles with uniform spherical shape, while slower stirring rate and lower PVA concentration resulted in larger particles, with which certain portion of non-spherical particles were found (FIG. 1C). The generation of these undesirable shapes was suppressed by controlling the stirring rate and the concentration of the PVA solution.

Figure 2:
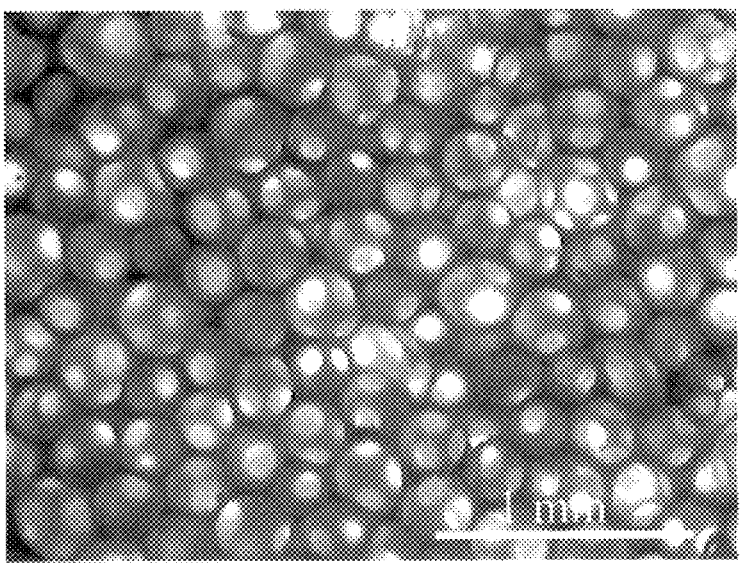
FIG. 2 is an optical micrograph of PLLA foam prepared with paraffin spheres having diameters ranging between about 250 $\mu$m and about 420 $\mu$m at 40× magnification.
Figure 4A:
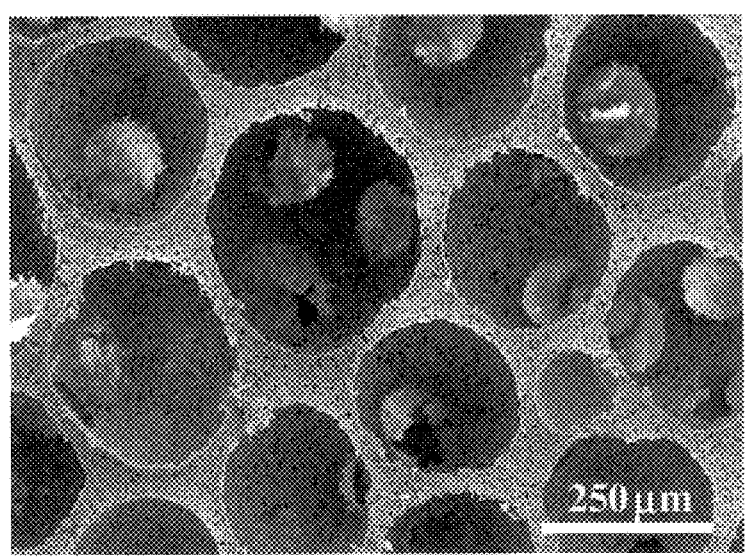
FIG. 4A is a SEM micrograph of a PLLA foam prepared with paraffin spheres having diameters ranging between about 250 $\mu$m and about 420 $\mu$m and a porosity of 95% (multiple casting steps) at 100× magnification.
Figure 4B:
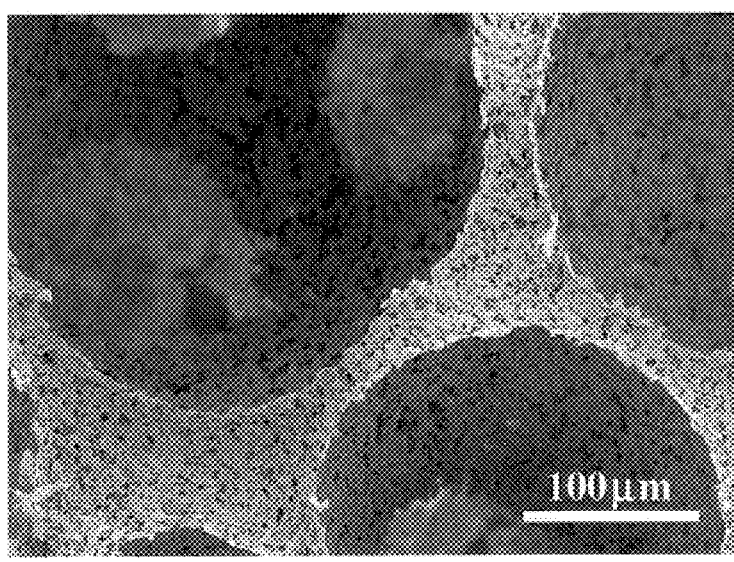
FIG. 4B is a SEM micrograph of a PLLA foam prepared with paraffin spheres having diameters ranging between about 250 $\mu$m and about 420 $\mu$m and a porosity of 95% (multiple casting steps) at 250× magnification.

The heat treatment at 37° C. produced firm bonding between the paraffin spheres to form a 3-D assembly (the paraffin spheres began to deform at 33–34° C.). This treatment ensured the complete connectivity of the pores of the final foam structure after the paraffin was leached out with a solvent/solvents. Because all the spheres were bonded together, no closed pores were generated when the paraffin assembly was removed, as demonstrated in the optical microscopic image of the foam (FIG. 2). The polymer was PLLA, the paraffin spheres were 250–420 $\mu$m in size, and the porosity was about 96%. The polymer skeleton of the foam appeared dark due to the low transmittance of light, while the pores appeared light due to the high transmittance of light. The bright areas were the holes connecting the pores. Any closed pore with trapped paraffin would have appeared as a black circle (in the darkest contrast) because of the lowest transmittance of light. However, no black circles were observed, suggesting that all the pores were open and well connected. Another benefit of the heat treatment was the mechanical stability of the resultant paraffin assembly in contrast to the loose paraffin spheres. The loose paraffin spheres could be easily disturbed by small droplets of polymer solution in the casting step, while the spatial relationships among the bonded paraffin spheres were maintained in the casting process.

PLLA/pyridine solutions of several different concentrations (8%, 10%, 12%, 15% and 18%) were tested to find an optimal casting concentration at room temperature. It was known that random packing densities of monodisperse spheres were 60–65%. See Reed, J. S., "Particle packing characterization," *Principles of ceramics processing*, J. S. Reed, Editor, (1995) John Wiley & Sons, Inc., New York, 215. The volume fraction of the free space of the packed paraffin spheres, therefore, was approximately 35–40%, neglecting the volume decrease resulting from the bonding between paraffin spheres. The volume of each disc of bonded paraffin spheres was about 0.85 cm$^3$ and thus a volume fraction of 40% corresponded to 0.34 ml. In the experiments, 0.40 ml polymer solution was used for each specimen to completely cover the paraffin disc. Different polymer concentrations resulted in different porosities (Table 1).

TABLE 1

Density, porosity and compressive modulus of PLLA foams.

| Polymer Concentration | Paraffin Sphere | Density (g/cm$^3$) | Porosity (%) | Compressive Modulus (MPa) |
|---|---|---|---|---|
| 10% (w/v) | 250~420 $\mu$m | 0.032 ± 0.002 | 96.8 ± 0.2 | 23.7 ± 18.5 |
| 12% (w/v) | 250~420 $\mu$m | 0.039 ± 0.003 | 96.1 ± 0.3 | 81.8 ± 17.1 |
| 15% (w/v) | 250~420 $\mu$m | 0.048 ± 0.004 | 95.2 ± 0.4 | 46.8 ± 21.3 |
| 18% (w/v) | 250~420 $\mu$m | 0.042 ± 0.001 | 95.8 ± 0.1 | 50.8 ± 13.2 |

In general, a polymer solution of higher concentration produced a denser structure. However, the mechanical properties did not necessarily increase with increasing density of the foams. Properties of the polymer foam made from 8% PLLA solution were too weak to measure. Highly concentrated polymer solutions such as 15% or 18% also resulted in relatively weak foam formation probably because the high viscosity of the polymer solutions impeded their flow into the interstices between the spheres. As a result, the polymer was not evenly distributed in the disc and weak areas were formed. The concentration of 12% (g/ml) was found to be suitable for casting at room temperature and this concentration was used for the rest of the study.

Figure 3:
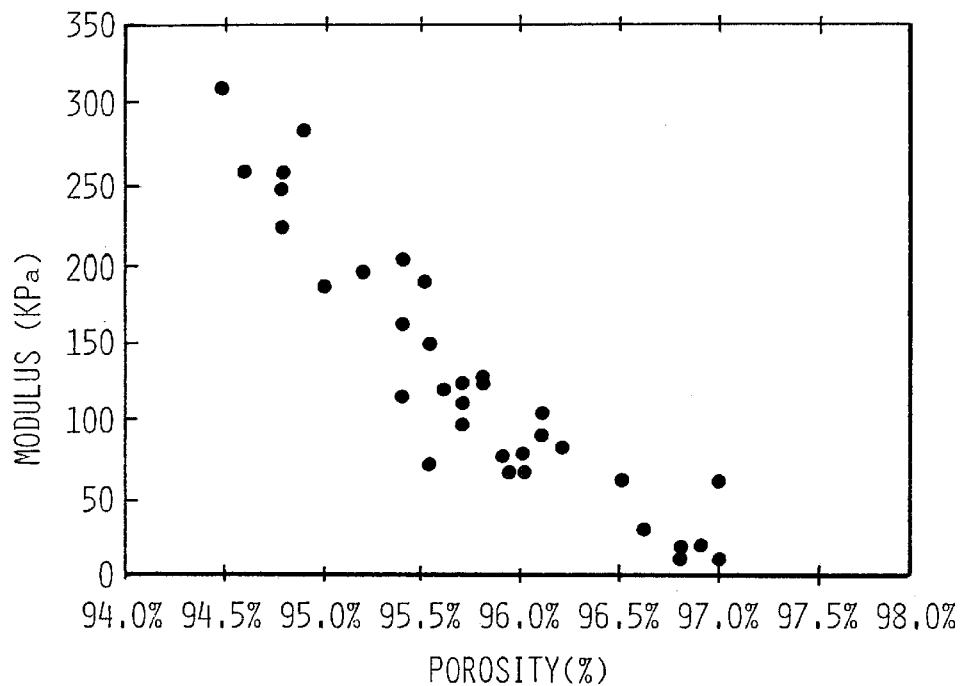
FIG. 3 is a graph plotting modulus vs. porosity of PLLA foams prepared with paraffin spheres having diameters ranging between about 250 $\mu$m and about 420 $\mu$m.

Because a porosity of lower than 96% was not achievable with only a single casting of 12% solution, several casting steps had to be repeated to form the denser foams with higher modulus (FIG. 3). For these homogeneous foams, the modulus increased with increasing foam density (decreasing porosity) in a monotonous way. At a porosity of 94.5%, a modulus of about 300 kPa was obtained.

Morphologies of these foams were studied with SEM (FIGS. 4A–4D). The PLLA foam had a porosity of 95%, and the original paraffin spheres were 250–420 $\mu$m in size. The pores retained the shapes of the original paraffin spheres and were well connected. The diameters of the cross sections of the individual pores appeared different from each other because the cutting surface intersected the pores at different positions. The openings between the pores were circular in shape and were similar in size. The macropore network was the replica of the surface of the bonded paraffin spheres. In other words, the hollow spherical shell network formed the continuous skeleton of the foam, and the pores were interconnected through the openings formed by the bonding areas of the paraffin spheres. The surface morphology of the pore wall was very similar to that of the new surface exposed by cutting, which indicated that the entire polymer skeleton of the foam was uniform in morphology. The polymer skeleton was composed of platelets and irregular micropores between them, similar to the morphology previously observed for PLLA foams prepared without paraffin spheres from different solvent systems at room temperature. The microporous walls of the macropores could be beneficial to the local mass transport in a scaffold for tissue engineering.

Figure 5A:
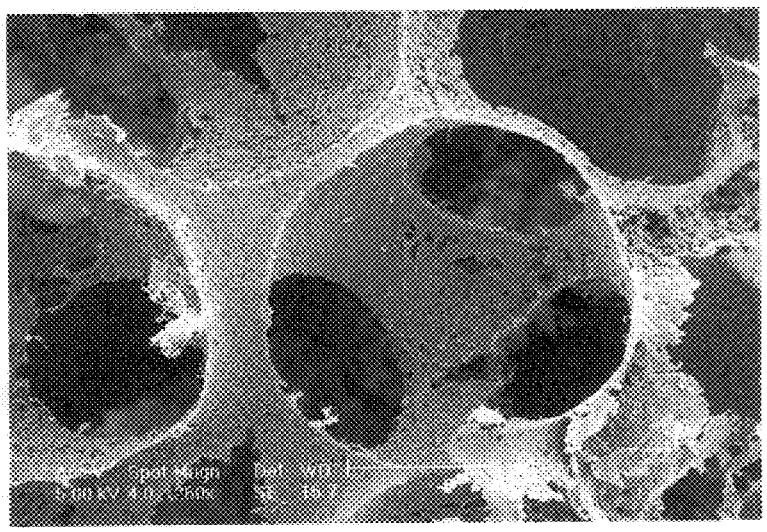
FIG. 5A is a SEM micrograph of a PLLA foam prepared with paraffin spheres having diameters ranging between about 250 $\mu$m and about 350 $\mu$m at 250× magnification and having a heat treatment at 37° C. for 20 min.
Figure 5B:
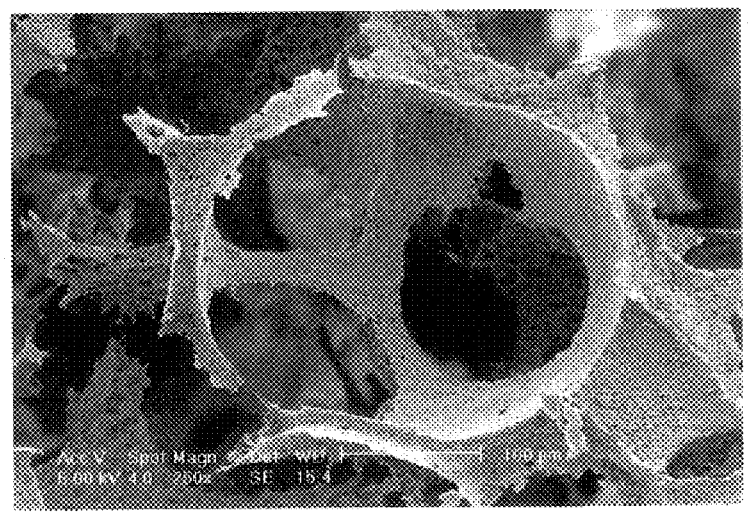
FIG. 5B is a SEM micrograph of a PLLA foam prepared with paraffin spheres having diameters ranging between about 250 $\mu$m and about 350 $\mu$m at 250× magnification and having a heat treatment at 37° C. for 80 min.
Figure 7A:
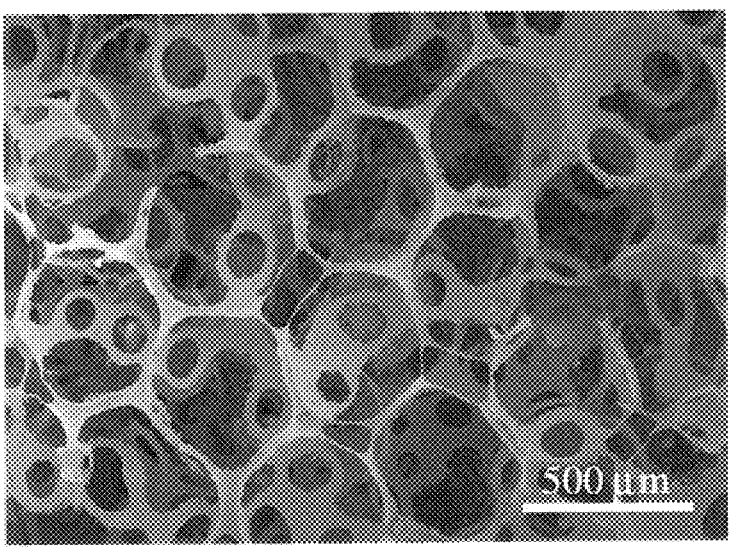
FIG. 7A is a SEM micrograph of a PLGA foam prepared with paraffin spheres having diameters ranging between about 420 $\mu$m and about 500 $\mu$m at 50× magnification and 96.5% porosity.
Figure 7B:
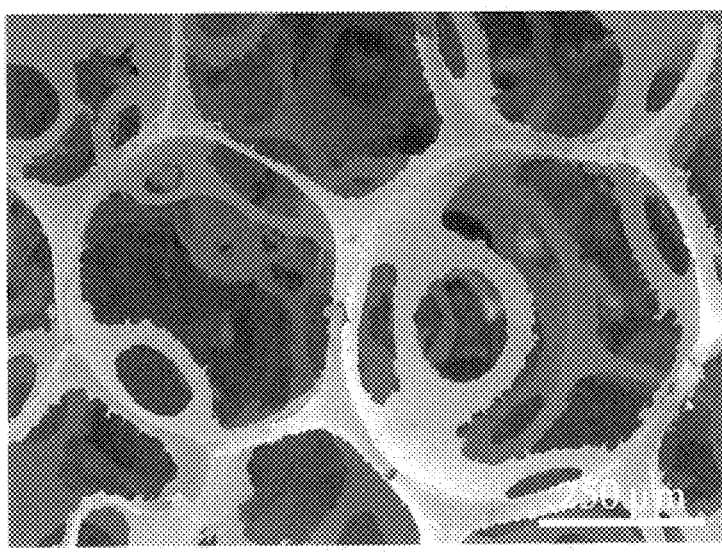
FIG. 7B is a SEM micrograph of a PLGA foam prepared with paraffin spheres having diameters ranging between about 420 $\mu$m and about 500 $\mu$m at 100× magnification and 96.5% porosity.
Figure 7C:
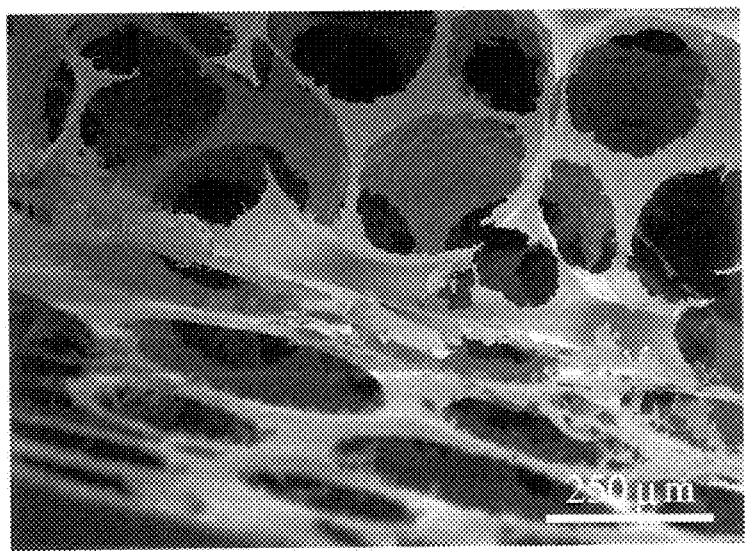
FIG. 7C is a SEM micrograph showing an edge view of a PLGA foam prepared with paraffin spheres having diameters ranging between about 420 $\mu$m and about 500 $\mu$m at 100× magnification and 96.5% porosity.
Figure 7D:
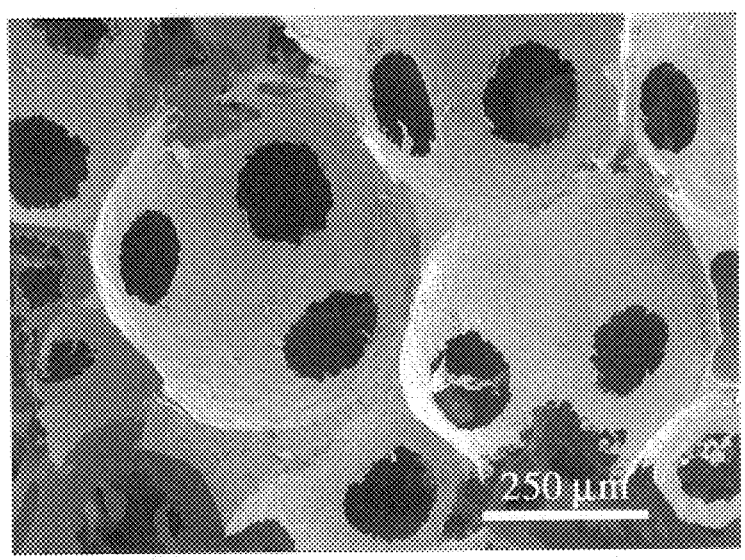
FIG. 7D is a SEM micrograph of a PLGA foam prepared with paraffin spheres having diameters ranging between about 420 $\mu$m and about 500 $\mu$m at 100× magnification and 95% porosity.
Figure 8A:
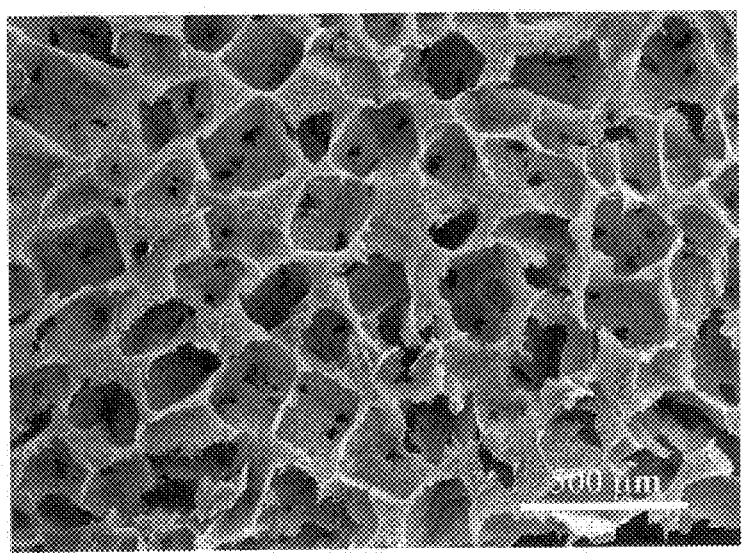
FIG. 8A is a SEM micrograph of a PLLA nano-fibrous matrix with particulate macropores prepared from a PLLA/THF solution and sugar particles having a particle size of between about 125 μm and about 250 μm at 50× magnification.
Figure 8B:
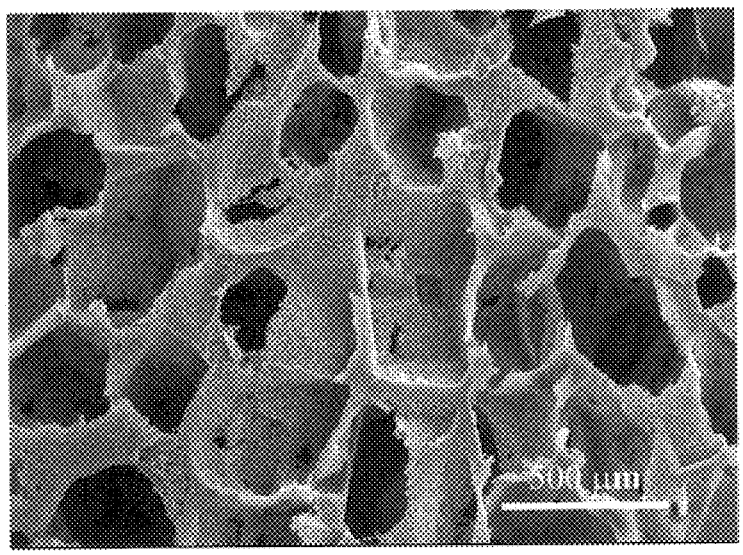
FIG. 8B is a SEM micrograph of a PLLA nano-fibrous matrix with particulate macropores prepared from a PLLA/THF solution and sugar particles having a particle size of between about 250 μm and about 500 μm at 50× magnification.
Figure 8C:
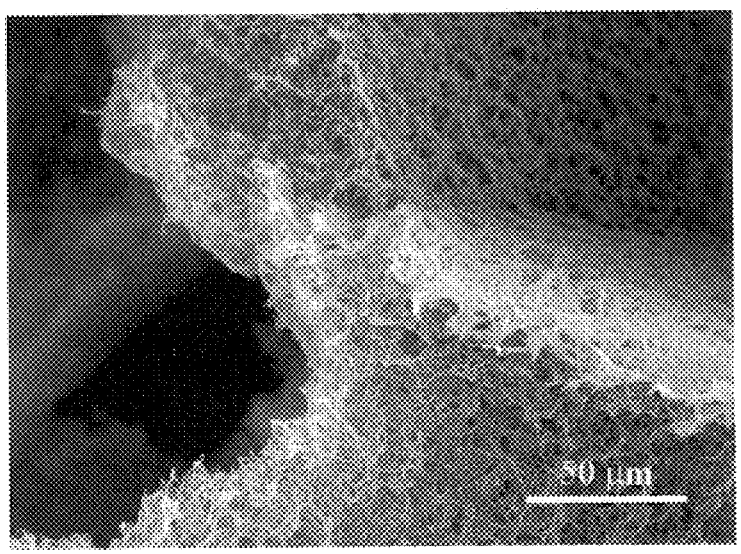
FIG. 8C is a SEM micrograph of a PLLA nano-fibrous matrix with particulate macropores prepared from a PLLA/THF solution and sugar particles having a particle size of between about 250 μm and about 500 μm at 500× magnification.
Figure 8D:
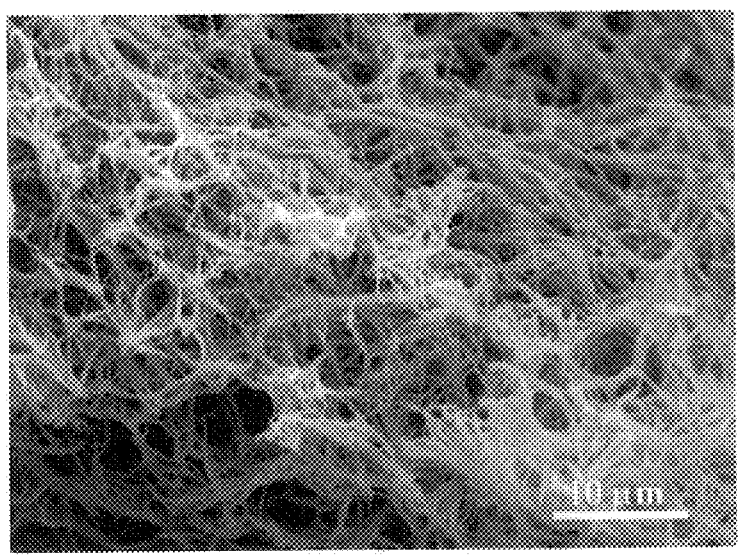
FIG. 8D is a SEM micrograph of a PLLA nano-fibrous matrix with particulate macropores prepared from a PLLA/THF solution and sugar particles having a particle size of between about 250 μm and about 500 μm at 2000× magnification.

Heat treatment at 37° C. for 20 minutes generated moderate size of the openings between the pores. It was expected that the size of these openings could be controlled by adjusting the time and the temperature of the heat treatment. In order to examine the effect of the time of heat treatment on the size of the openings between macropores, paraffin spheres of narrow size distribution (250–350 µm) were treated at 37° C. for 20 and 80 minutes respectively. The longer time of the heat treatment formed larger bonding areas between the paraffin spheres, and resulted in larger openings between the macropores of the polymer foam (FIGS. 5A and 5B).

Figure 6:
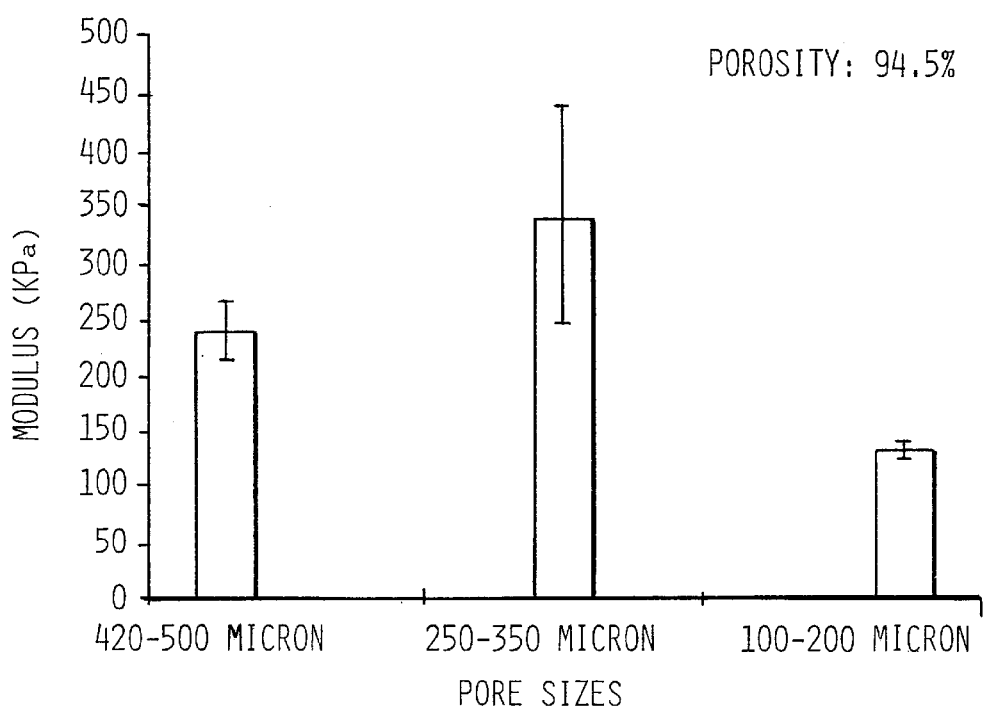
FIG. 6 is a graph showing pore size effect on the compressive modulus of PLLA foam with a porosity of 94.5%.
Figure 4C:
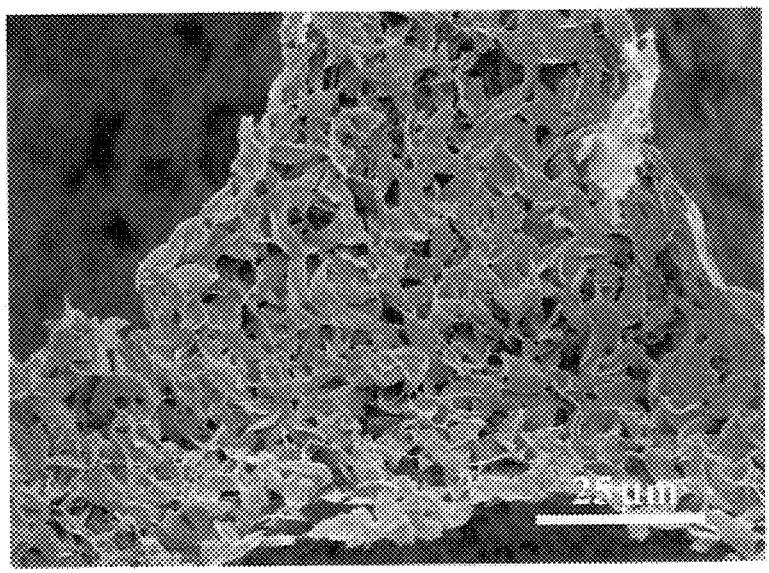
FIG. 4C is a SEM micrograph of a PLLA foam prepared with paraffin spheres having diameters ranging between about 250 $\mu$m and about 420 $\mu$m and a porosity of 95% (multiple casting steps) at 1000× magnification.
Figure 4D:
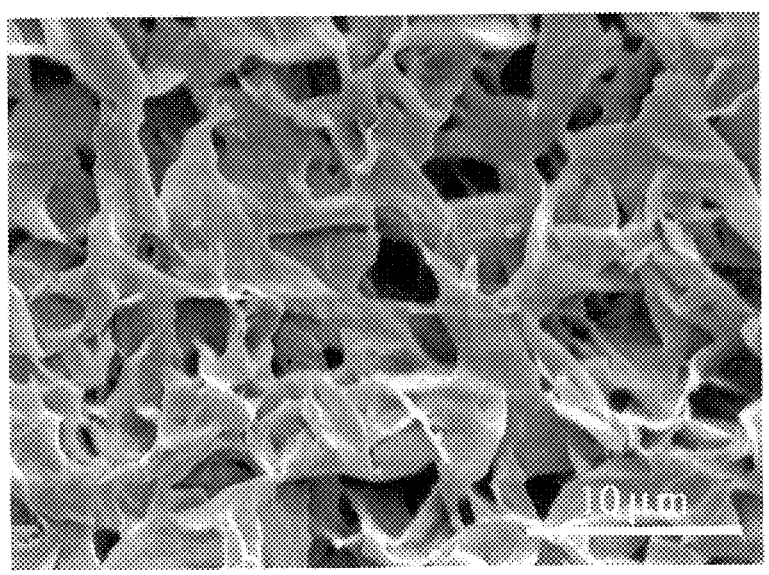
FIG. 4D is a SEM micrograph of a PLLA foam prepared with paraffin spheres having diameters ranging between about 250 $\mu$m and about 420 $\mu$m and a porosity of 95% (multiple casting steps) at 3000× magnification.

The mechanical properties of the polymer foams were affected by the pore size (FIG. 6). The PLLA foams prepared with three different sizes of paraffin spheres were controlled at the same porosity level (94.5%). When the paraffin spheres with the size of 100–200 µm were used, modulus of the formed foam was statistically lower than that of the foams prepared with larger paraffin spheres. The difference between the two larger pore sizes was not statistically significant. The lower modulus of the foams prepared with the smaller paraffin spheres might have resulted from the heterogeneity of polymer distribution because the polymer solution might penetrate with more difficulty into the smaller interstices between smaller spheres.

Foams were also prepared using PLGA85/15 copolymer (FIG. 7). Paraffin spheres of the sizes of 420–500 µm were used and the concentration of the polymer solution was 12%. Unlike in PLLA foams, neither platelets nor micropores were found either on the surface of the pore wall or in the interior of the polymer skeleton of the foams. The entire structure was homogeneous and well connected. This could stem from the difference in the physical structure of the two polymers. The PLGA85/15 copolymer was amorphous while PLLA was semi-crystalline. The platelet structure could be formed through a nucleation and crystal growth process from a crystalline polymer PLLA. Amorphous polymer PLGA85/15 did not crystallize, therefore only a smoother layer of polymer was deposited on the paraffin spheres. At a high porosity, polymer only covered the connecting areas between the original paraffin spheres (larger connecting lines between spheres or the necklines of the bonding areas) likely due to the surface tension effect of the polymer solution (FIGS. 7A & 7B). The overall interconnected pore architecture was demonstrated in an edge view of the foam (FIG. 7C). At a lower porosity, the open surface of the paraffin spheres was covered more to form a more continuous hollow shell morphology (FIG. 7D).

Discussion of Experimental Results

Scaffolding may be a critical component in tissue engineering because it provides the three dimensional clues for cell seeding, migration, growth, and the new tissue formation. Synthetic polymers such as polylactide, polyglycolide, and poly(lactide-co-glycolide) are biodegradable, biocompatible, and are FDA approved for certain clinical applications such as resorbable sutures. Therefore, these polymers are widely exploited as scaffolding materials for tissue engineering. Salt-leaching is a very popular technique to fabricate scaffolds from a variety of polymers, and is well recorded in the literature. In this technique, the polymer (usually in the solution form) is first mixed with NaCl salt crystals to form a polymer/salt composite material (after solvent evaporation). The salt is then leached out with water to form the pores of the polymer foam. The pore size can be controlled by the size of the salt crystals, and the porosity can be controlled by the salt/polymer ratio. However, with the salt-leaching technique, the pore shape is limited to the cubic crystal shape of the NaCl salt, and more disadvantageously the interpore connectivity is not controlled.

The method of the present invention has fabricated paraffin spheres as a pore generating material (porogen) to create spherical pore shapes in the biodegradable polymer foams. The control of the porosity and the pore size was demonstrated by changing the concentration of the polymer solution, the number of casting times and the size of the paraffin spheres. Furthermore, the inventive method includes a technique to bond these paraffin spheres together to stabilize the structure and more importantly to ensure the creation of an interconnected pore network in the polymer foam.

The present method has also demonstrated that the bonding areas between paraffin spheres can be controlled to vary the size of the openings between the spherical pores, which can be very important in controlling cell seeding and distribution in the scaffolds. The processability of the paraffin can also be utilized to generate other geometrical components to be assembled into more complex structure for architecturally complex scaffolding formation, as with a sugar porogen.

The macroporous architectural design can be utilized to improve mass transport and neo-vasculature formation when implanted in vivo. The macroporous architectural design can be used to vary the flow pattern of the tissue culture medium in these scaffolds in bioreactor cultures and to mediate the fluid mechanical stimulation to engineered tissue constructs. It has further been demonstrated that the foam architecture and pore wall structure (platelet like or continuous) are dependent on the polymer (especially the crystallizability) and the polymer concentration used. In addition, the paraffin sphere assembly can be dissolved in some organic solvents (nonsolvents of the polymer) so that certain water-soluble polymers can be involved in the scaffolding materials with this technique, which is important in improving the hydrophilicity of the scaffolding materials when desired.

There are also several advantages in the new fabrication methods. First, there is no sophisticated equipment requirement compared to the textile technology, free-forming, 3-D printing or lithography. Second, the new scaffolding has a homogeneous foam skeleton (either platelet-like or continuous depending on the crystallizability of the polymer), which is not easily achievable with free-forming, 3-D printing or lithography because of their "pixel assembly" nature. Third, the inter-pore connectivity and the size of the opening between pores are well controlled by the heat treatment process of the paraffin spheres. Fourth, the scaffold can be directly fabricated into a specific anatomical shape with a mold. Fifth, the process can be easily expanded or automated for large-scale production.

In conclusion, the new processing technique of the present invention can tailor the polymer foams for a variety of potential tissue engineering and other biomedical applications because of the well-controlled nature in architecture, inter-pore connectivity, physical and mechanical properties.

EXAMPLE 2

Poly(L-lactic acid) (PLLA) with an inherent viscosity of approximately 1.6 was purchased from Boehringer Ingelheim (Ingelheim, Germany). PLLA was used without further purification. Tetrahydrofuran (THF), sugar and NaCl were obtained from Aldrich Chemical (St. Louis, Mo.).

Processing Methods

1. Polymer Solution

PLLA was dissolved in THF to make a polymer solution with a desired concentration. It took about two hours to obtain a homogeneous solution when stirred with a magnetic stirrer at 60° C.

2. Preparation of Geometrical Porogen Elements

The sugar and salt particles were sifted with standard sieves and collected by the desired sizes. The sugar fibers and thin discs were melt processed as follows. The sugar particles were contained in a beaker and heated to 120–130° C. until completely melted. The sugar fibers were drawn from the sugar melt using a spatula. When one end of the spatula tip touched the sugar melt it adhered to the melt. The spatula was slowly moved away from the melt to draw a fiber out of the melt. The fiber solidified at room temperature. The fiber diameter was controlled by the drawing rate. The fibers with diameters between 100 and 500 $\mu$m were produced and separated according to the desired sizes. The sugar discs were pressed from the melt in between two glass slides. The homogeneous sugar melt was dropped on one slide and the second slide was put on top of the melt. A pressure was applied manually on the top of the slide to achieve the desired thickness. Sugar discs with a diameter of 2 cm and a thickness of 400±100 $\mu$m were obtained for this study. The sugar discs were punched with a hot needle with a diameter of 500 microns to form ~50 holes/cm$^2$.

3. Preparation of the 3-D Macroporous Nano-Fibrous Matrices

PLLA matrices with particulate macropores were prepared by combining phase separation and porogen leaching techniques as follows: (A) 2.0 grams of sugar or salt particles of desired size were added into a TEFLON vial. The particle surface was leveled by tapping the vial on its upper edge and pressing with a thin plate on the top of the sugar or salt. The vial was then warmed to 50° C. 0.6 ml prepared PLLA/THF solution was pipetted and dripped slowly onto the particles. The vial containing PLLA solution and the porogen particles was then transferred into a freezer at a preset temperature to gel. (B) The vials containing the gel/particle composite were immersed into distilled water to extract the solvent and to leach the particles from the composite simultaneously for four days. Water was changed three times a day. (C) The gel was removed from water and blotted by a piece of filter paper, and then was kept in a freezer at −20° C. for at least 2 hours to be completely frozen. (D) The frozen gel was taken into a freeze-drying vessel at between −5 and −10° C. in an ice/salt bath, and was freeze-dried at vacuum lower than 0.5 mm Hg for one week. The dried foam was then stored in a desiccator until characterization.

For the preparation of the matrix with a predesigned pore structure, the porogen components such as sugar particles, sugar fibers and sugar discs were organized into a desired architecture. The PLLA solution was dripped into the porogen frame and then cooled down to a preset temperature to gel. After this procedure, the matrix with desired macroporous architectures were obtained with the processes (B), (C) and (D) described in the previous paragraph.

In some cases, the geometrical porogen elements were stacked layer by layer to form complex pore architectures. In such a process, a moisture treatment was used for the sugar porogen components to adhere to one another. The water vapor atmosphere was produced by putting 4 small dishes (Falcon, 35×10 mm) of water in a big covered dish (Falcon, 150×15 mm) containing the porogen assembly. The sugar porogen components had been exposed to the moisture for at least 10 minutes before another layer was stacked.

Characterization

The melting behavior of the matrices was characterized with a differential scanning calorimeter (DSC-7, Perkin-Elmer) as disclosed in my U.S. Pat. No. 6,146,892 cited hereinabove. The degree of crystallinity, $X_c$, of a sample was calculated as: $X_c = \Delta H_m / \Delta H_m^0$, where $\Delta H_m$ was the measured enthalpy of melting and $\Delta H_m^0$ was the enthalpy of melting for 100% crystalline polymer. For PLLA, $\Delta H_m^0 = 203.4$ J/g. See Jamshidi K., S. H. Hyon and Y. Ikada, "Thermal Characterization of Polylactides," *Polymer* 29(12):2229–2234 (1988).

The estimated density and porosity of the matrix prepared from PLLA/THF were obtained as follows: A certain volume of PLLA/THF solution was pipetted into a cylindrical TEFLON vial containing a porogen assembly, and the matrix was fabricated as described in the Processing Methods section. The diameter and height of the matrix were measured to calculate the volume. The mass of the matrix was measured with an analytical balance. The density was calculated from the volume and mass. The porosity, $\epsilon$, was calculated from the measured overall densities $D_f$ of the fibrous matrix and the skeletal density $D_P$:

$$\epsilon = \frac{Dp - Df}{Dp} \qquad (1)$$

For the fibrous matrix, the skeletal density was the density of the polymer, which was given by:

$$D_p = \frac{1}{\frac{1-X_c}{D_a} + \frac{X_c}{D_c}} \qquad (2)$$

where $X_c$ was the degree of crystallinity of the polymer. The density of amorphous PLLA ($D_a$) is 1.248 g/ml and the density of 100% crystalline PLLA ($D_c$) is 1.290 g/ml. See Fischer, E. W., H. J. Sterzel and G. Wegner, "Investigation of the structure of solution grown crystals of lactide copolymers by means of chemical reactions," *Kolloid-Zeitschrift and Zeitschrift für Polymere* 251:980–990 (1973).

The porous morphologies of the matrices were examined with scanning electron microscopy (SEM) (S-3200N, Hitachi, Japan) at 15 kV. To expose the internal architecture, the samples were cut with a razor blade after being frozen in liquid nitrogen for 5 minutes. The samples were coated with gold using a sputter coater (Desk-II, Denton Vacuum Inc.). The gas pressure was less than 50 mtorr and the current was about 40 mA. The coating time was 200 seconds.

Results

1. Particulate Macroporous and Nano-Fibrous Matrices

Nano-fibrous matrices with particulate macropores were generated from a biodegradable polymer (PLLA) with either sugar or inorganic salt particles as a porogen in combination with a phase separation technique (Table 2).

TABLE 2

Density and porosity of PLLA matrix prepared from PLLA/THF solution with different particulate porogens (gelling temperature: −18° C.)

| PLLA/THF Concentration | Porogen | Particle Size (μm) | Density (g/ml) | Porosity (%) |
|---|---|---|---|---|
| 5.0% (wt/v) | sugar | 125–250 | 0.0272 | 97.8 |
| 5.0% (wt/v) | sugar | 250–500 | 0.0264 | 97.9 |
| 5.0% (wt/v) | sugar | 500–750 | 0.0264 | 97.9 |
| 5.0% (wt/v) | salt | 125–250 | 0.0281 | 97.8 |
| 5.0% (wt/v) | salt | 250–500 | 0.0332 | 97.4 |

Figure 9A:
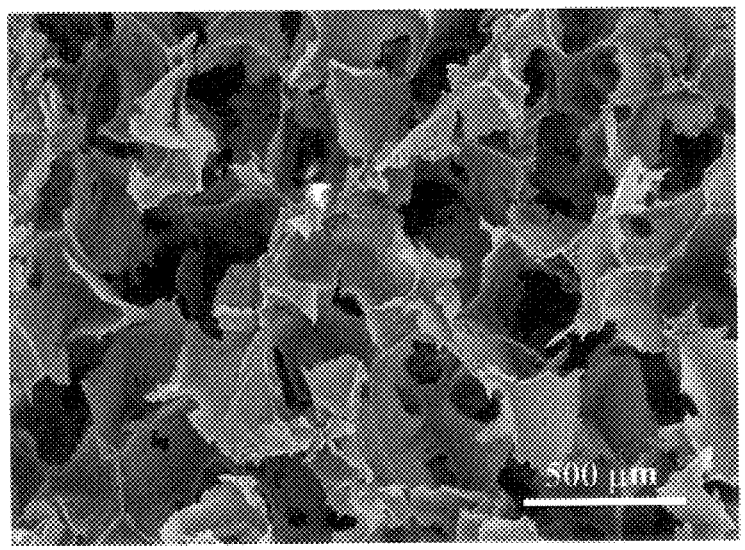
FIG. 9A is a SEM micrograph of PLLA nano-fibrous matrix with particulate macropores prepared from a PLLA/THF solution and NaCl particles having a particle size of between about 250 μm and about 500 μm at 50× magnification.
Figure 9B:
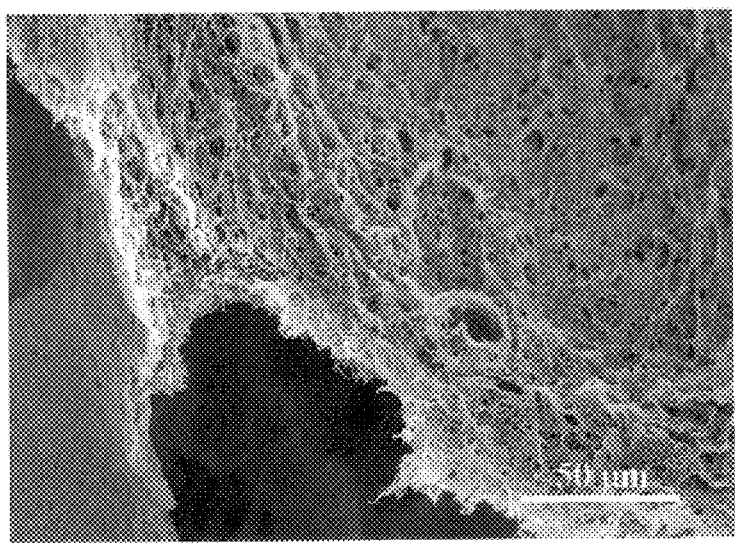
FIG. 9B is a SEM micrograph of PLLA nano-fibrous matrix with particulate macropores prepared from a PLLA/THF solution and NaCl particles having a particle size of between about 250 μm and about 500 μm at 500× magnification.

These matrices have very low density and high porosity. SEM micrographs demonstrated the interconnected open pore structure and nano-fibrous pore walls (FIGS. 8 and 9). There were three size scales involved in these matrices, i.e, the macropore size, interfiber distance, and fiber diameter. The macropores were a few hundred micrometers in size determined by the used porogen particle size (FIGS. 8A–8D). Sugar and NaCl particles generated similar macropore structures for the synthetic polymer matrices (FIGS. 8 and 9A and 9B). The interfiber distance was determined by the polymer concentration used, which was similar to that of nano-fibrous PLLA matrices without sugar or salt porogen (see my U.S. Pat. No. 6,146,892 cited herein). The matrix morphology was also similarly determined by the phase-separation temperature, solvent used, and processing variables. The fiber diameter ranged also from 50 to 500 nanometers, the same as that without the sugar or salt porogen.

2. Uniaxially Oriented Tubular Macroporous and Nano-Fibrous Matrices

Figure 11A:
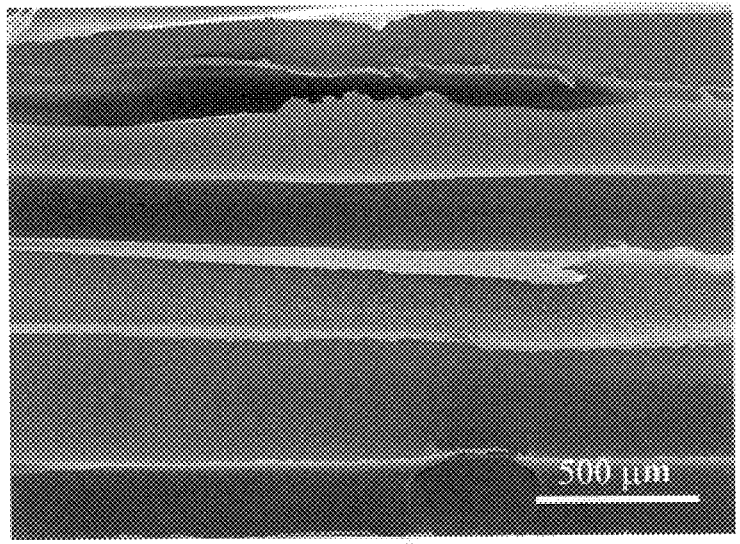
FIG. 11A is a SEM micrograph of PLLA nano-fibrous matrix with uniaxially oriented tubular architecture prepared from a PLLA/THF solution and a uniaxially oriented sugar fiber assembly at 40× magnification.
Figure 10:
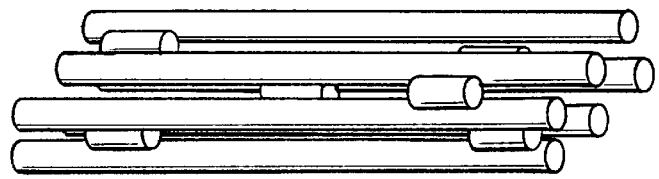
FIG. 10 is a perspective schematic illustration showing a uniaxially oriented sugar fiber assembly.
Figure 11B:
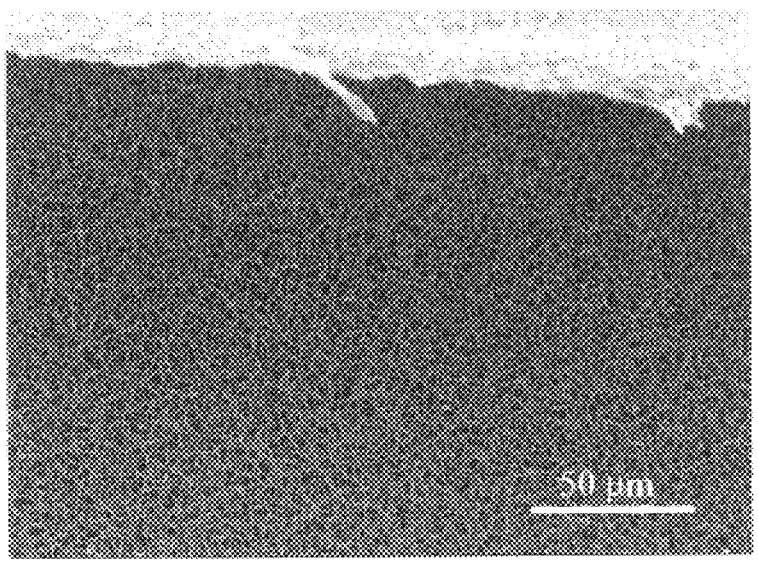
FIG. 11B is a SEM micrograph of PLLA nano-fibrous matrix with uniaxially oriented tubular architecture prepared from a PLLA/THF solution and a uniaxially oriented sugar fiber assembly at 500× magnification.

Water soluble fibers were prepared from sugar as geometrical porogen elements, and were used to form a new porous architecture, which was uniaxially oriented tubular macropores in a nano-fibrous matrix. To obtain this complex pore architecture, the porogen frame was prepared by assembling sugar fibers in parallel (FIG. 10). The sugar fiber assembly was stabilized by being exposed to a water vapor atmosphere for an hour, and then being vacuum dried for 24 hours. The PLLA solution was dripped onto the porogen frame and cooled down to a preset temperature to gel. The composite gel then went through water leaching, freezing and freeze-drying processes as described in my U.S. Pat. No. 6,146,892 cited hereinabove. The SEM micrograph, taken from a central area of the sample that was cut parallel to the sugar fiber direction, demonstrated the uniaxially oriented tubular macropore formation in a nanofibrous matrix (FIGS. 11A and 11B).

3. Orthogonal Tubular Macropore Network and Nano-Fibrous Matrices

Figure 12:
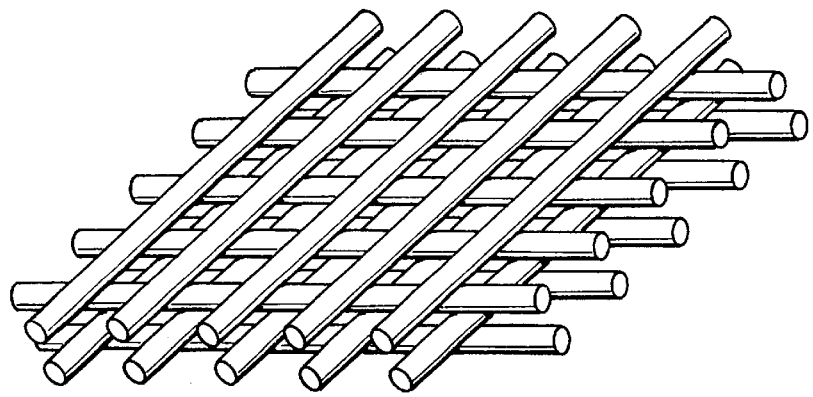
FIG. 12 is a perspective schematic illustration of an orthogonal sugar fiber assembly.
Figure 13A:
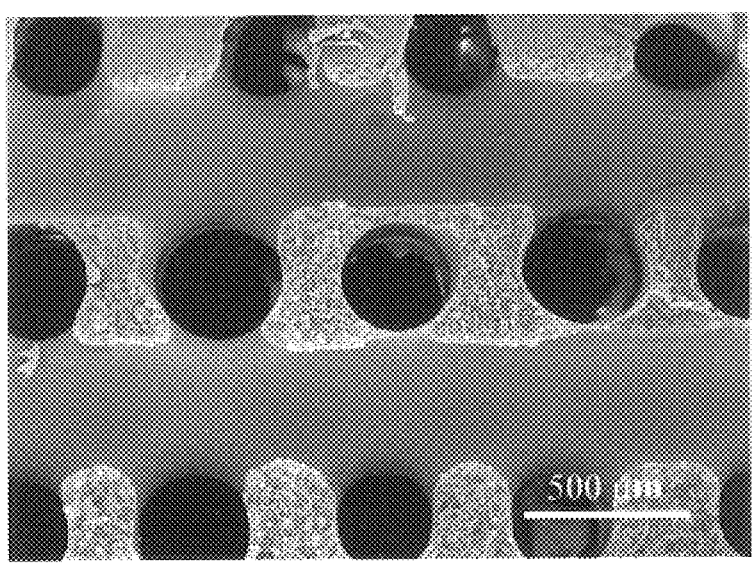
FIG. 13A is a SEM micrograph of PLLA nano-fibrous matrix with orthogonal tubular macropore network prepared from a PLLA/THF solution and an orthogonal sugar fiber assembly at 40× magnification.
Figure 13B:
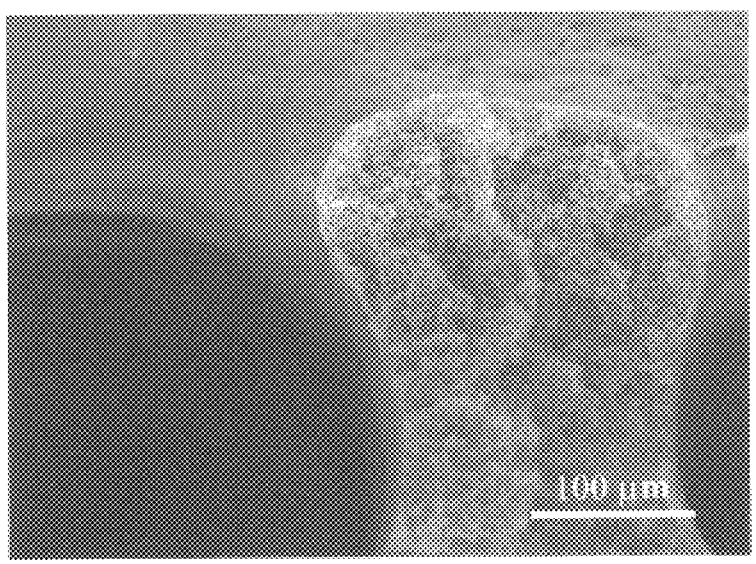
FIG. 13B is a SEM micrograph of PLLA nano-fibrous matrix with orthogonal tubular macropore network prepared from a PLLA/THF solution and an orthogonal sugar fiber assembly at 250× magnification.

To fabricate orthogonally oriented tubular pores in a polymer matrix, the negative replica of this structure was first assembled with the porogen materials—sugar fibers (FIG. 12). The sugar fibers with nearly identical diameters (~300 microns) were selected and parallel arranged into one layer. The second layer of the sugar fibers was laid on the top of the first layer and aligned at a right angle to the first layer. The third layer was aligned parallel to the first layer (at a right angle to the second layer). By repeating this process, an assembly of orthogonal sugar fiber plies was formed. After polymer solution casting, gelation, water leaching and freeze-drying, a three-dimensional nano-fibrous matrix with orthogonal tubular macropores was obtained (FIGS. 13A and 13B). The SEM micrograph demonstrated that the tubular pores in different layers were interconnected at the contacting points of the original sugar fibers. A uniform diameter of sugar fibers was important to obtain open connections between the tubular macropores. A smaller sugar fiber could result in an isolated or half isolated tubular pore (FIG. 13A), because it might not adhere to the fibers in the neighboring layers.

4. Helicoidal Tabular Macropore Network and Nano-Fibrous Matrices

Figure 14:
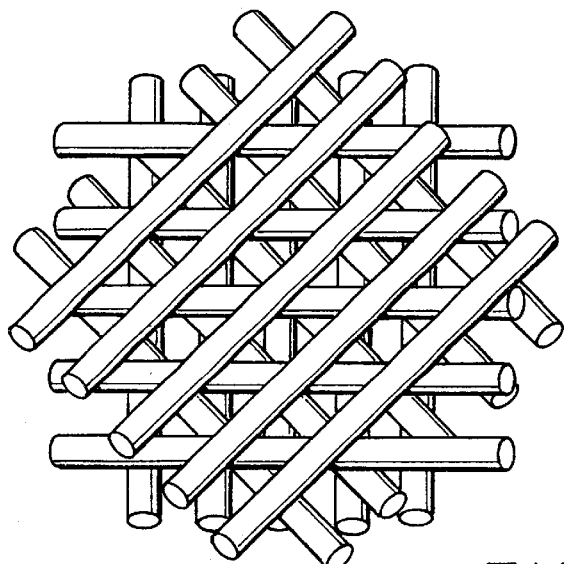
FIG. 14 is a perspective schematic illustration of a helicoidal sugar fiber assembly.
Figure 15A:
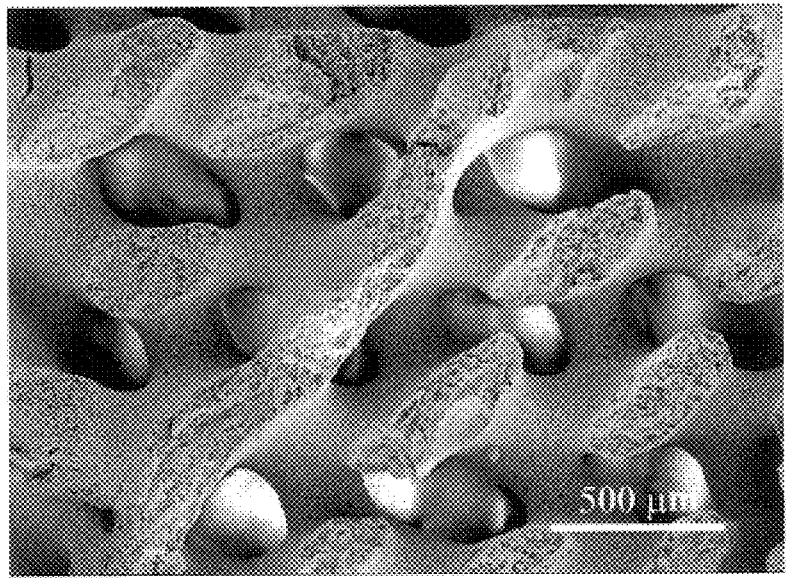
FIG. 15A is a SEM micrograph of PLLA nano-fibrous matrix with helicoidal tubular macropore network prepared from a PLLA/THF solution and a helicoidal sugar fiber assembly at 35× magnification.
Figure 15B:
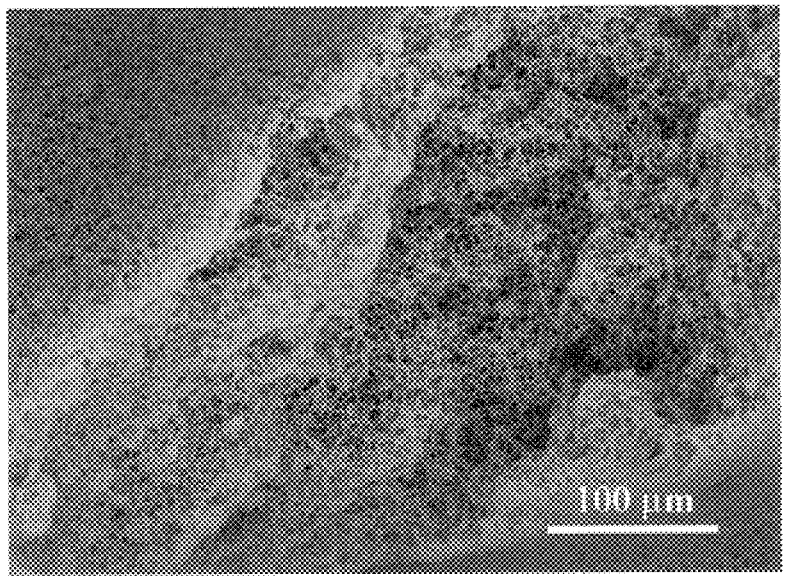
FIG. 15B is a SEM micrograph of PLLA nano-fibrous matrix with helicoidal tubular macropore network prepared from a PLLA/THF solution and a helicoidal sugar fiber assembly at 250× magnification.

Orthogonal orientation achieved in the previous section was a special case of helicoidal orientation (at a right angle between layers). Similarly, at an angle other than the right angle between layers of the sugar fibers, a helicoidal sugar fiber assembly could be obtained. An example of helicoidal sugar fiber assembly was achieved by continuously rotating a 45° angle between neighboring layers (FIG. 14). After polymer solution casting, gelation, water leaching and freeze-drying, helicoidal tubular macropores were formed in a nano-fibrous matrix (FIGS. 15A and 15B). The tubes were clearly interconnected into a 3-D network.

5. Multi-Layer Planar Macropores and Nano-Fibrous Matrices

Figure 16:
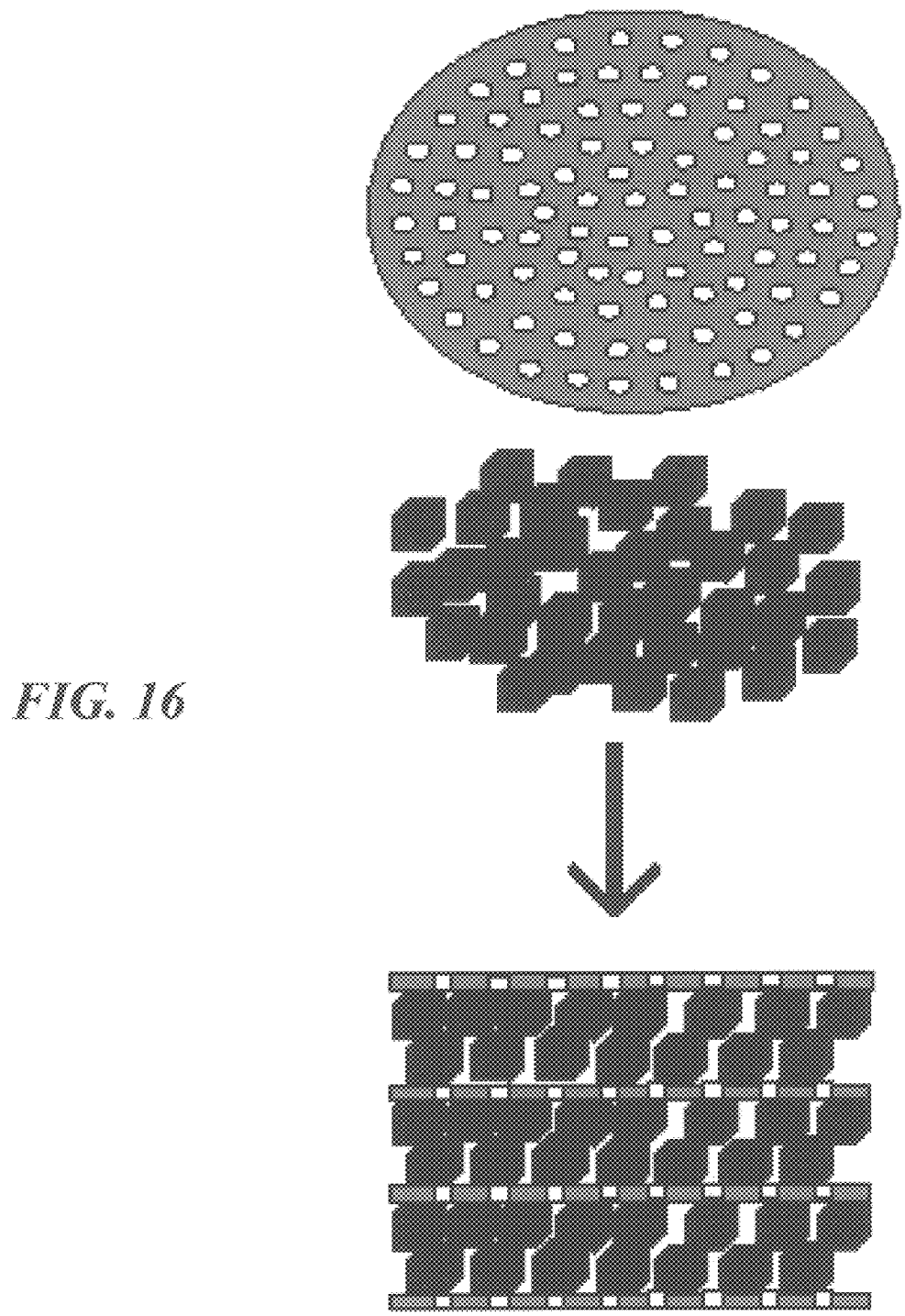
FIG. 16 is a schematic illustration of a multi-layer sugar disc and particle assembly.
Figure 17A:
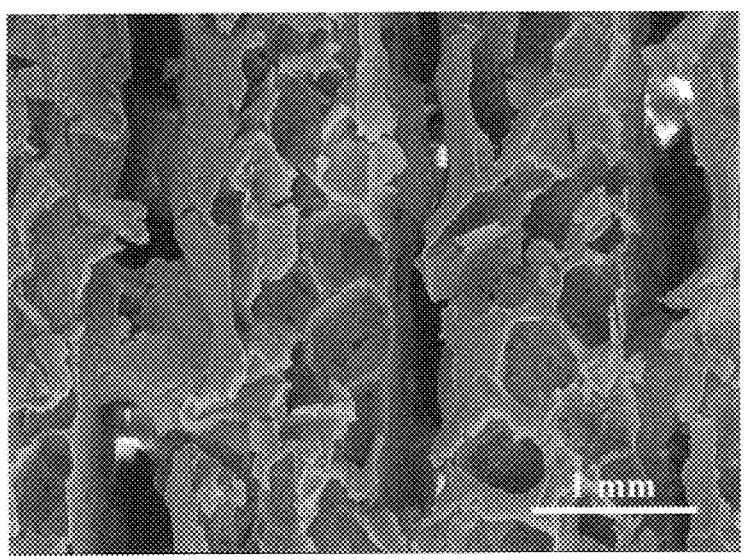
FIG. 17A is a SEM micrograph of PLLA nano-fibrous matrix with multi-layer planar macropore network prepared from a PLLA/THF solution and a 3-D assembly of sugar discs and particles at 25× magnification.
Figure 17B:
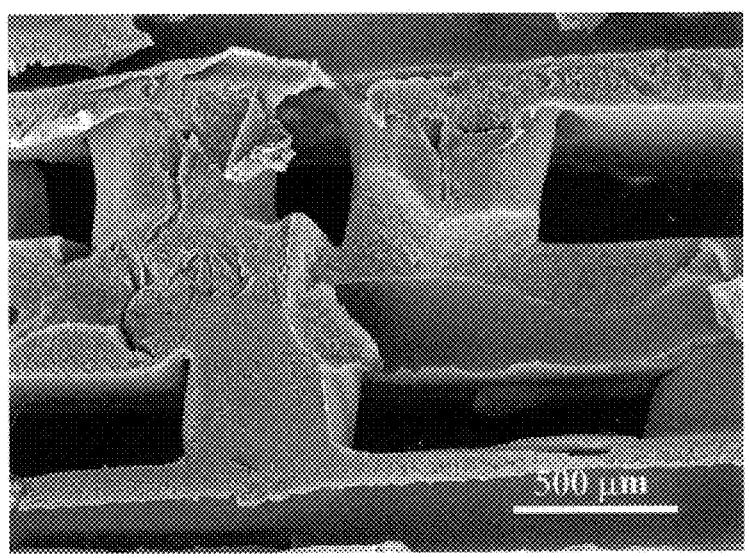
FIG. 17B is a SEM micrograph of PLLA nano-fibrous matrix with multi-layer planar macropore network prepared from a PLLA/THF solution and a 3-D assembly of sugar discs and fibers at 30× magnification.

Sugar discs were prepared as described in the Materials and Methods section. The sugar discs with a large number of holes were arranged together with either sugar particles or sugar fibers to form a porogen assembly (FIG. 16). After polymer solution casting, gelation, water leaching and freeze-drying, the sugar discs became planar pores with matrix connections formed from the holes in the sugar discs (FIGS. 17A and 17B). The layers of sugar particles or fibers formed particulate or tubular macropores.

Discussion of Experimental Results

Tissue engineering is an interdisciplinary field that applies the principles of engineering and the life sciences toward the development of biological substitutes that restore, maintain, or improve tissue function. See Nerem, R. M. and A. Sambanis, "Tissue Engineering: From Biology to Biological Substitutes," *Tissue Engineering* 1(1):3–13 (1995). Biomaterials play a pivotal role in tissue engineering by serving as matrices for cell seeding/ingrowth, proliferation, and new tissue formation in three dimensions. See Hubbell, J. A., "Biomaterials in Tissue Engineering," *Bio/Technology* 13:565–576 (1995). Biodegradable polymers such as polylactide, polyglycolide, and poly(lactide-co-glycolide) are biocompatible and biodegradable (see Mikos, A., M. Lyman, L. Freed and R. Langer, "Wetting of poly(L-lactic acid) and poly(DL-lactic-co-glycolic acid) foams for tissue culture," *Biomaterials* 15(1):55–58 (1994)), and have been explored for a variety of tissue engineering applications. See Rodriguez, A., Y. L. Cao, C. Ibarra, S. Pap, M. Vacanti, R D. Eavey and C. A. Vacanti, "Characteristics of cartilage engineered from human pediatric auricular cartilage," *Plastic & Reconstructive Surgery* 103(4):1111–1119 (1999); and Kim, S. S., H. Utsunomiya, J. A. Koski, B M. Wu, M. J. Cima, J. Sohn, K. Mukai, L. G. Griffith and J. P. Vacanti, "Survival and function of hepatocytes on a novel three-dimensional synthetic biodegradable polymer scaffold with an intrinsic network of channels," *Annals of Surgery* 228(1):8–13 (1998). Collagen is a natural extracellular matrix component of many types of tissues, and its nano-fibrous architecture has long been noticed to play a role in cell adhesion, growth and differentiated function in tissue cultures. See Strom, S. C. and G. Michalopoulos, "Collagen as a substrate for cell growth and differentiation," *Methods in Enzymology* 82 Pt A:544–555 (1982); and Grinnell, F. and M. H. Bennett, "Ultrastructural studies of cell--collagen interactions," *Methods in Enzymology* 82 Pt A: 535–544 (1982). To mimic the nano-fibrous architecture and overcome the concerns of disease transmission and immunogenicity associated with collagen, biodegradable polymers have been successfully processed into nano-fibrous matrices as disclosed in my U.S. Pat. No. 6,146,892 cited hereinabove. In the present invention, it has been successfully demonstrated how to create a variety of macroporous architectures in the nano-fibrous matrices, aimed to improve spatial cellular distribution, mass transfer and new tissue organization.

It has first been demonstrated how a particulate leaching technique can be combined with a phase separation technique to generate macroporous and nano-fibrous polymer matrices. In this approach, sugar and salt can be used very similarly to create macropores because both of them are soluble in water and not soluble in a selected solvent of the polymer. By utilizing the processability of the sugar, the present invention has further demonstrated that more complex and predesigned macroporous architectures can be created within the nano-fibrous matrices. Sugar particles, fibers, and discs have been used as examples of geometrical elements to construct the negative replicas of the macroporous architectures. It has been shown that these geometrical porogen elements can be used individually or in combination to form many different macroporous architectures. The present invention has created synthetic polymer matrices with architectural features at several levels, including the anatomical shape of the matrix, macroporous elements (ranging from ~100 microns to millimeters), interfiber distance (microns), and the diameter of the fibers (50–500 nanometers). In this way, many more geometrical shapes and size scales of sugar porogen can be produced and combined to form countless complex architectures. Although in the Examples herein the porogen elements have been manually fabricated and assembled, the processes could be automated with freeform, 3-D printing, lithographic and other micro and even nano fabrication technologies. These fabrication techniques are different from the traditional freeform or 3-D printing and the like in that the initially assembled structure is the negative replica of the final pore architecture. One of the disadvantages of the freeform or 3-D printing is the structural heterogeneity due to the "pixel assembly" process. With this reversed fabrication process of the present invention, the preform is the porogen assembly that is leached out at a later stage, and a continuous nano-fibrous matrix with macroporous architecture of the negative replica of the porogen assembly is formed. This process ensures the continuity in structure and properties of the nano-fibrous matrices.

EXAMPLE 3

Figure 18A:
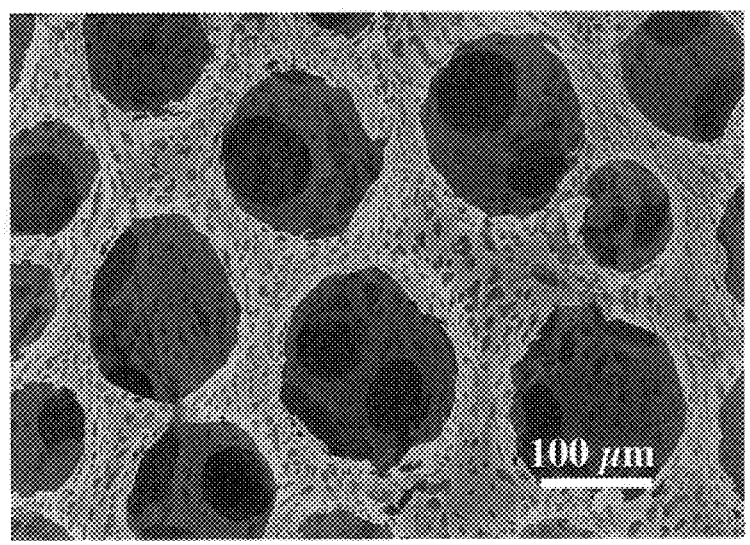
FIG. 18A is a SEM micrograph of a PLLA foam prepared with paraffin spheres having diameters ranging between about 150 μm and about 250 μm at 150× magnification.
Figure 18B:
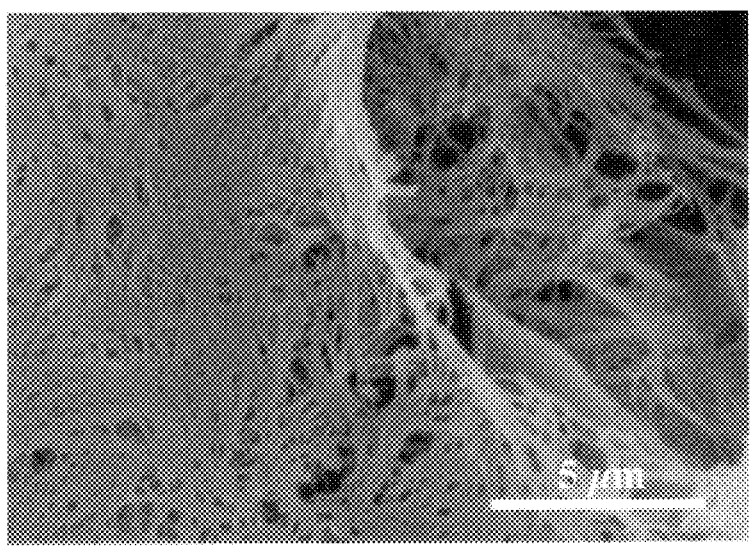
FIG. 18B is a SEM micrograph of a PLLA foam prepared with paraffin spheres having diameters ranging between about 150 μm and about 250 μm at 6000× magnification.
Figure 18C:
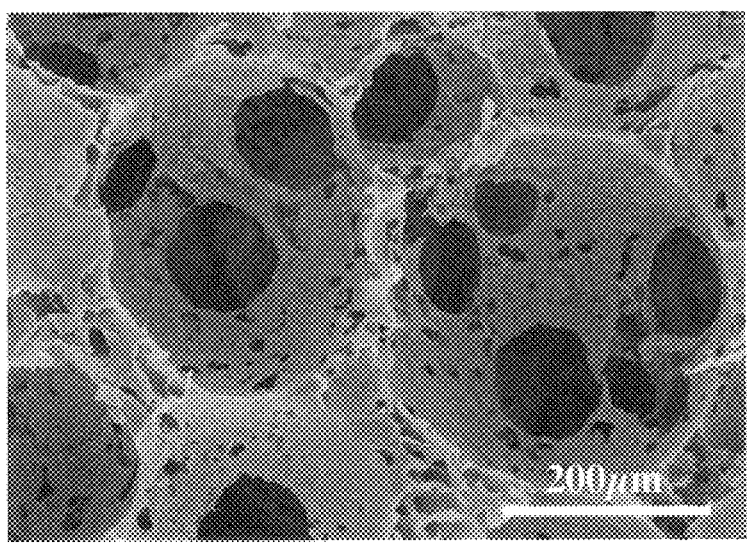
FIG. 18C is a SEM micrograph of a PLLA foam prepared with paraffin spheres having diameters ranging between about 250 μm and about 420 μm at 150× magnification.
Figure 18D:
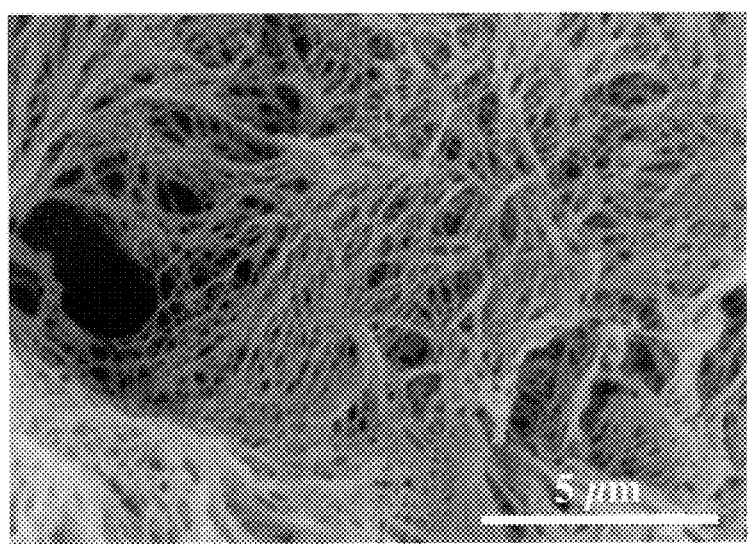
FIG. 18D is a SEM micrograph of a PLLA foam prepared with paraffin spheres having diameters ranging between about 250 μm and about 420 μm at 7000× magnification.

Paraffin spheres were prepared and bonded together in a Teflon vial via a thermal treatment at 37° C. for 30 minutes by the method of Example 1. 7.5% (g/mL) PLLA solution in a mixed solvent of dioxane and methanol (80/20 volume ratio) was prepared and cast onto the boned paraffin sphere assembly in the Teflon mold. The vial containing the polymer and paraffin was transferred to a freezer (−18° C.) to gel. The vial containing the gelled polymer/paraffin was immersed into cold hexanes (−18° C.) to extract the solvent. Hexanes were changed 2 times a day for 2 days. The gel was then removed from the vial and placed into hexane at room temperature to extract the remaining solvent and to leach the paraffin. This was done for 2 days, changing the hexanes 3 times a day. Hexane was then exchanged with cyclohexane overnight. The gel was removed from the cyclohexane and was frozen (−18° C.) for at least 6 h. The frozen gel was freeze-dried for 4 days in an ice/salt bath. The interconnected macrospherical pores were formed within nano fibrous PLLA matrices. FIG. 18 is a collection of SEM micrographs: FIG. 18A: Paraffin sphere diameter 150–250 μm, 150×; FIG. 18B: Paraffin sphere diameter 150–250 μm, 6000×; FIG. 18C: Paraffin sphere diameter 250–420 μm, 150×; and FIG. 18D: Paraffin sphere diameter 250–420 μm, 7000×.

EXAMPLE 4

Figure 19A:
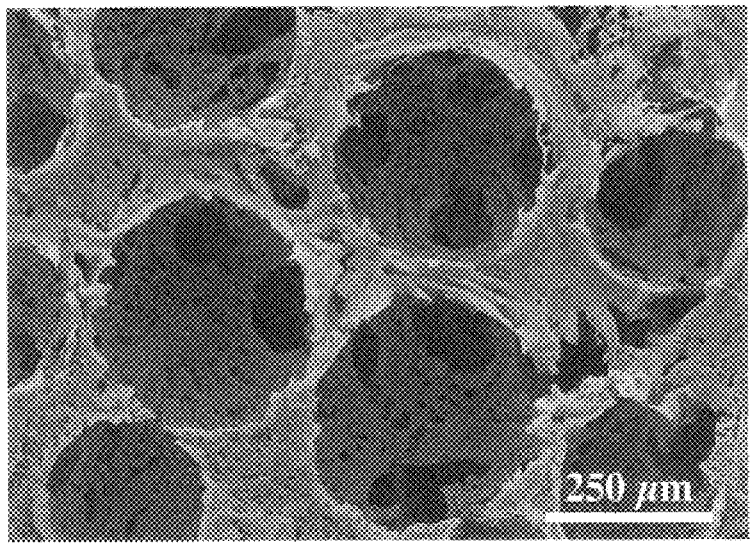
FIG. 19A is a SEM micrograph of a PLLA foam prepared with paraffin spheres having diameters ranging between about 250 μm and about 420 μm at 100× magnification.
Figure 19B:
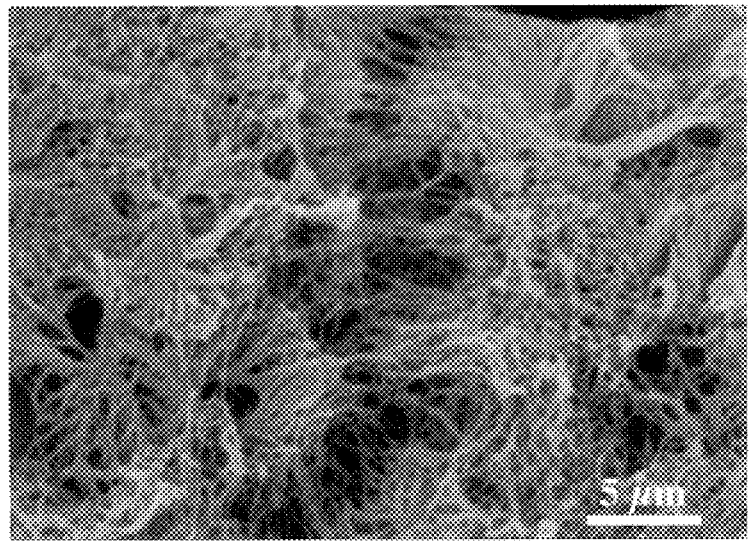
FIG. 19B is a SEM micrograph of a PLLA foam prepared with paraffin spheres having diameters ranging between about 250 μm and about 420 μm at 3500× magnification.

Paraffin spheres were prepared and bonded together in a Teflon vial via a thermal treatment at 37° C. for 30 min per the method described in Example 1. 7.5% (g/mL) PLLA solution in a mixed solvent of dioxane and pyridine (50/50 volume ratio) was prepared and cast onto the boned paraffin sphere assembly in the Teflon mold. The vial containing the polymer and paraffin was transferred to a freezer (−70° C.) to gel. The vial containing the gelled polymer/paraffin was immersed into cold hexanes (−18° C.) to extract the solvent. Hexanes were changed 2 times a day for 2 days. The gel was then removed from the vial and placed into hexane at room temperature to extract the remaining solvent and to leach the paraffin. This was done for 2 days, changing the hexanes 3 times a day. Hexane was then exchanged with cyclohexane overnight. The gel was removed from the cyclohexane and was frozen (−70° C.). The frozen gel was freeze-dried under vacuum in the freezer (−70° C.) for 5 days, and then was vacuum dried at room temperature for 1 day. The interconnected macrospherical pores were formed within nano fibrous PLLA matrices. FIG. 19A is a SEM micrograph of Paraffin sphere diameter 250–420 μm, 100×; and FIG. 19B is a SEM micrograph of Paraffin sphere diameter 250–420 μm, 3500×.

The macroporous architectural design of the present invention enables cell seeding and distribution in the three-dimensional nano-fibrous matrices for tissue engineering. The macroporous architecture also provides channels for improved mass transport and neo-vascularization after being implanted in vivo. The cells in the macroporous nano-fibrous matrices, in contrast to the foams made with traditional salt-leaching technique, will attach on and interact with a nano-fibrous network instead of "solid walls" during the in vivo and in vitro growth. These new synthetic extracellular matrices may provide better environment for cell distribution, adhesion, growth, and differentiated function. The architectural design at several size scales gives these novel matrices the potential to be tailored into ideal scaffolds for a variety of tissue engineering applications.

The architectural design size scales include the anatomical shape of the matrix, macroporous elements (100 microns to millimeters), interfiber distance (microns), and the diameter of the fibers (50–500 nanometers). These scaffolding materials circumvent the concerns of pathogen transmission and immuno-rejection associated with natural collagen. With the flexibility in the design of chemical structure, molecular weight, architecture, degradation rate and mechanical properties, these novel synthetic matrices may serve as superior scaffolding for tissue engineering.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for forming a porous material, the method comprising the steps of:

casting a natural or synthetic composition onto a negative replica of a desired macroporous architecture of the porous material, thereby forming a body, shaped porogen materials having been assembled into a predesigned three-dimensional configuration, wherein the predesigned three-dimensional configuration is the negative replica; and removing the porogen materials from the body, thereby forming the porous material having the desired macroporous architecture.

2. The method as defined in claim 1 wherein the method is a continuous process.

3. The method as defined in claim 1 wherein the method is a batch process.

4. The method as defined in claim 1 wherein the natural or synthetic composition includes a liquid.

5. The method as defined in claim 4 wherein the natural or synthetic composition when cast is at least one of a solution, a melt, a slurry, flowable powders, flowable pastes, and mixtures thereof.

6. The method as defined in claim 4 wherein the liquid is a solvent, and wherein the natural or synthetic composition further comprises a polymeric composition.

7. The method as defined in claim 3 wherein, before the casting step, the method further comprises the step of forming the porogen material into at least one predetermined shape.

8. The method as defined in claim 1 wherein the porogen material is selected from the group consisting of salts, sodium hydroxide, sugars, waxes, gelatins, naphthalene, natural or synthetic water soluble polymers, natural or synthetic non-water soluble polymers, degradable polymers, non-degradable polymers, partially degradable polymers, and mixtures thereof.

9. The method as defined in claim 8 wherein the porogen material is a salt selected from the group consisting of sodium chloride, potassium chloride, sodium fluoride, potassium fluoride, sodium iodide, sodium nitrate, sodium sulfate, sodium iodate, and mixtures thereof.

10. The method as defined in claim 8 wherein the porogen material is a sugar selected from the group consisting of saccharin, glucose, fructose, water soluble sugars, and mixtures thereof.

11. The method as defined in claim 8 wherein the porogen material is a wax selected from the group consisting of paraffin, beeswax, and mixtures thereof.

12. The method as defined in claim 1 wherein the shaped porogen materials have at least one predetermined shape selected from the group consisting of cubic or other geometrically shaped crystals, spheres, fibers, discs, regular geometric shapes, irregular geometric shapes, and mixtures thereof.

13. The method as defined in claim 1 wherein the natural or synthetic composition is selected from materials which retain their cast shape during the porogen material removing step.

14. The method as defined in claim 13 wherein the natural or synthetic composition comprises a material selected from the group consisting of ceramics, glass, inorganic compounds, and mixtures thereof.

15. The method as defined in claim 13 wherein the natural or synthetic composition is a polymeric composition.

16. The method as defined in claim 15 wherein the polymeric composition is selected from the group consisting of natural or synthetic hydrophilic polymers, natural or synthetic hydrophobic polymers, natural or synthetic amphophilic polymers, degradable polymers, non-degradable polymers, partially degradable polymers, proteins, artificial proteins, and mixtures thereof.

17. The method as defined in claim 16 wherein the polymeric composition is selected from the group consisting of poly(lactide-co-glycolide) (PLGA), poly(lactide) (PLLA), polyglycolic acid (PGA), polyanhydrides, poly (ortho ethers), polycaprolactone, polyethylene glycol (PEG), polyurethane, copolymers thereof, and mixtures thereof.

18. The method as defined in claim 16 wherein the natural or synthetic hydrophilic polymers are selected from the group consisting of polyacrylic acid, polyvinyl alcohol, polyethylene oxide, polyethylene glycol, polymethacrylic acid (PMAA), alginates, collagens, gelatins, hyaluronic acid, and mixtures thereof.

19. The method as defined in claim 16 wherein the natural or synthetic hydrophobic polymers are selected from the group consisting of poly(methyl methacrylate) (PMMA), polycarbonate, polypropylene oxide (PPO), polyamides, polyvinylidene fluoride (PVDF), polybutylene, polyacrylonitrile, and mixtures thereof.

20. The method as defined in claim 1, further comprising the step of adding functional or inert additives to the porous material.

21. The method as defined in claim 20 wherein the additives are selected from the group consisting of inorganic salts, minerals, drugs, peptides, and mixtures thereof.

22. A method for forming a porous material, the method comprising the steps of:

forming a porogen material into at least one predetermined shape;

assembling a plurality of the shaped porogen materials into a predesigned three-dimensional configuration, wherein the three-dimensional configuration is a negative replica of a desired macroporous architecture of the porous polymeric material;

casting a natural or synthetic composition onto the negative replica, thereby forming a body; and removing the porogen materials from the body, thereby forming the porous material having the desired macroporous architecture.

23. The method as defined in claim 22 wherein the porogen material is selected from the group consisting of salts, sodium hydroxide, sugars, waxes, gelatins, naphthalene, natural or synthetic water soluble polymers, natural or synthetic non-water soluble polymers, degradable polymers, non-degradable polymers, partially degradable polymers, and mixtures thereof.

24. The method as defined in claim 23 wherein the porogen material is a salt selected from the group consisting of sodium chloride, potassium chloride, sodium fluoride, potassium fluoride, sodium iodide, sodium nitrate, sodium sulfate, sodium iodate, and mixtures thereof.

25. The method as defined in claim 23 wherein the porogen material is a sugar selected from the group consisting of saccharin, glucose, fructose, water soluble sugars, and mixtures thereof.

26. The method as defined in claim 23 wherein the porogen material is a wax selected from the group consisting of paraffin, beeswax, and mixtures thereof.

27. The method as defined in claim 22 wherein the at least one predetermined shape is selected from the group consisting of cubic or other geometrically shaped crystals, spheres, fibers, discs, regular geometric shapes, irregular geometric shapes, and mixtures thereof.

28. The method as defined in claim 22 wherein the natural or synthetic composition is selected from materials which retain their cast shape during the porogen material removing step.

29. The method as defined in claim 28 wherein the natural or synthetic composition is a polymeric composition.

30. The method as defined in claim 29 wherein the polymeric composition is selected from the group consisting of natural or synthetic hydrophilic polymers, natural or synthetic hydrophobic polymers, natural or synthetic amphophilic polymers, degradable polymers, non-degradable polymers, partially degradable polymers, proteins, artificial proteins, and mixtures thereof.

31. The method as defined in claim 30 wherein the polymeric composition is selected from the group consisting of poly(lactide-co-glycolide) (PLGA), poly(lactide) (PLLA), polyglycolic acid (PGA), polyanhydrides, poly(ortho ethers), polycaprolactone, polyethylene glycol (PEG), polyurethane, copolymers thereof, and mixtures thereof.

32. The method as defined in claim 30 wherein the natural or synthetic hydrophilic polymers are selected from the group consisting of polyacrylic acid, polyvinyl alcohol, polyethylene oxide, polyethylene glycol, polymethacrylic acid (PMAA), alginates, collagens, gelatins, hyaluronic acid, and mixtures thereof.

33. The method as defined in claim 30 wherein the natural or synthetic hydrophobic polymers are selected from the group consisting of poly(methyl methacrylate) (PMMA), polycarbonate, polypropylene oxide (PPO), polyamides, polyvinylidene fluoride (PVDF), polybutylene, polyacrylonitrile, and mixtures thereof.

34. The method defined in claim 22, further comprising the step of adding functional or inert additives to the porous material.

35. The method as defined in claim 34 wherein the additives are selected from the group consisting of inorganic salts, minerals, drugs, peptides, and mixtures thereof.

36. A method for forming a porous material, the method comprising the steps of:

casting a natural or synthetic composition onto a negative replica of a desired macroporous architecture of the porous material, thereby forming a body, the negative replica having been formed from a predetermined three-dimensional configuration of shaped porogen materials; and removing the porogen materials from the body, thereby forming the porous material having the desired macroporous architecture;

wherein the natural or synthetic composition is a polymeric composition selected from materials which retain their cast shape during the porogen material removing step, and wherein the polymeric composition is selected from the group consisting of degradable polymers, and mixtures thereof; and wherein the degradable polymers are selected from the group consisting of polyamino acids.

37. A method for forming a porous material, the method comprising the steps of:

forming a porogen material into at least one predetermined shape;

combining a plurality of the shaped porogen materials into a predetermined three-dimensional configuration, wherein the three-dimensional configuration is a negative replica of a desired macroporous architecture of the porous polymeric material;

casting a natural or synthetic composition onto the negative replica, thereby forming a body; and removing the porogen materials from the body, thereby forming the porous material having the desired macroporous architecture;

wherein the natural or synthetic composition is a polymeric composition selected from materials which retain their cast shape during the porogen material removing step, and wherein the polymeric composition is selected from the group consisting of degradable polymers, and mixtures thereof; and wherein the degradable polymers are selected from the group consisting of polyamino acids.

* * * * *

UNITED STATES PATENT AND TRADEMARK OFFICE
CERTIFICATE OF CORRECTION

PATENT NO. : 6,673,285 B2
DATED : January 6, 2004
INVENTOR(S) : Peter X. Ma

It is certified that error appears in the above-identified patent and that said Letters Patent is hereby corrected as shown below:

Column 7,
Line 40, "(PMM)" should read -- (PMAA) --.

Column 10,
Line 57, "$\rho_{92}$" should read --$\rho_p$ --;
Line 66, "PC" should be changed to -- $\rho_c$ --.

Column 11,
Line 36, "($\rho$<0.05)." should read -- (p<0.05). --.

Signed and Sealed this

Twelfth Day of October, 2004

JON W. DUDAS
*Director of the United States Patent and Trademark Office*